(12) United States Patent
Semo

(10) Patent No.: US 12,524,764 B2
(45) Date of Patent: Jan. 13, 2026

(54) SYSTEMS AND METHODS FOR TARGETED POTENTIAL TRANSACTION DELIVERY WITHOUT USING COOKIE DATA

(71) Applicant: Kevin Semo, San Diego, CA (US)

(72) Inventor: Kevin Semo, San Diego, CA (US)

( * ) Notice: Subject to any disclaimer, the term of this patent is extended or adjusted under 35 U.S.C. 154(b) by 336 days.

(21) Appl. No.: 18/491,591

(22) Filed: Oct. 20, 2023

(65) Prior Publication Data

US 2025/0131426 A1 Apr. 24, 2025

(51) Int. Cl.
  *G06Q 20/40* (2012.01)
  *G06Q 30/0201* (2023.01)

(52) U.S. Cl.
  CPC ....... *G06Q 20/401* (2013.01); *G06Q 30/0201* (2013.01)

(58) Field of Classification Search
  CPC ............. G06Q 20/401; G06Q 30/0201; G06Q 20/387; G06Q 30/0207; G06Q 30/0221; G06Q 30/0251; G06Q 50/01
  USPC .......................................................... 705/75
  See application file for complete search history.

(56) References Cited

U.S. PATENT DOCUMENTS

| | | | | |
|---|---|---|---|---|
| 11,030,648 B1 * | 6/2021 | Daya | ................. | G06Q 30/0254 |
| 11,430,000 B1 * | 8/2022 | Depaolo | ............ | G06Q 30/0601 |
| 2010/0312626 A1 * | 12/2010 | Cervenka | ............... | G06Q 20/12 |
| | | | | 705/44 |
| 2024/0386403 A1 * | 11/2024 | Fortiscue | ............. | G06Q 20/387 |

* cited by examiner

*Primary Examiner* — Zeshan Qayyum
(74) *Attorney, Agent, or Firm* — Foley & Lardner LLP

(57) ABSTRACT

A method comprises storing, by one or more processors in memory, a database comprising a plurality of accounts; receiving potential transaction data corresponding to potential transactions; generating a potential transaction identifier for each of the potential transactions; selecting a subset of the potential transactions; presenting the selected subset of the potential transactions on a user interface; receiving a selection of a first potential transaction from the subset of the potential transactions; generating an account potential transaction code based on a first account identifier of a first user account and a first potential transaction identifier of the first potential transaction; transmitting the account potential transaction code; receiving a transaction request for a transaction, the transaction request comprising the account potential transaction code; and updating the first user account to indicate the transaction.

20 Claims, 9 Drawing Sheets

SYSTEMS AND METHODS FOR TARGETED POTENTIAL TRANSACTION DELIVERY WITHOUT USING COOKIE DATA

BACKGROUND

Many people use the Internet every day. Some use it to discover information such as news, recipes, phone numbers, etc. Some use the Internet to communicate with others through mediums such as chat rooms, message boards, and e-mail. And some use the Internet to purchase online goods or services. Traffic on the Internet is large, and many people use the Internet for extended periods of time.

One area that has been impacted by the proliferation of the Internet is the service industry. Different service industries are transitioning from brick-and-mortar stores that people visit to receive services to online stores that people visit to make online orders for pick-up or delivery. One example of a service industry transitioning to online orders is the food and restaurant industry. Industries that are transitioning to provide their services online are also transitioning to spreading information about the services they perform on the Internet.

Often, service providers seek to provide relevant services to users that the users can appreciate. To do so, the service providers may use first-party and/or third-party tracking cookies on browsers that the users use to browse different web pages on the Internet. The cookies may enable the service providers to collect data and better determine which services are most likely to be relevant to specific individual users. However, various privacy concerns have caused companies that support browsers to disable third-party and first-party cookies and restrict service providers from storing such cookies on their browsers. Accordingly, service providers are left "in the dark" and may not have any method of providing relevant services to users of the Internet.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
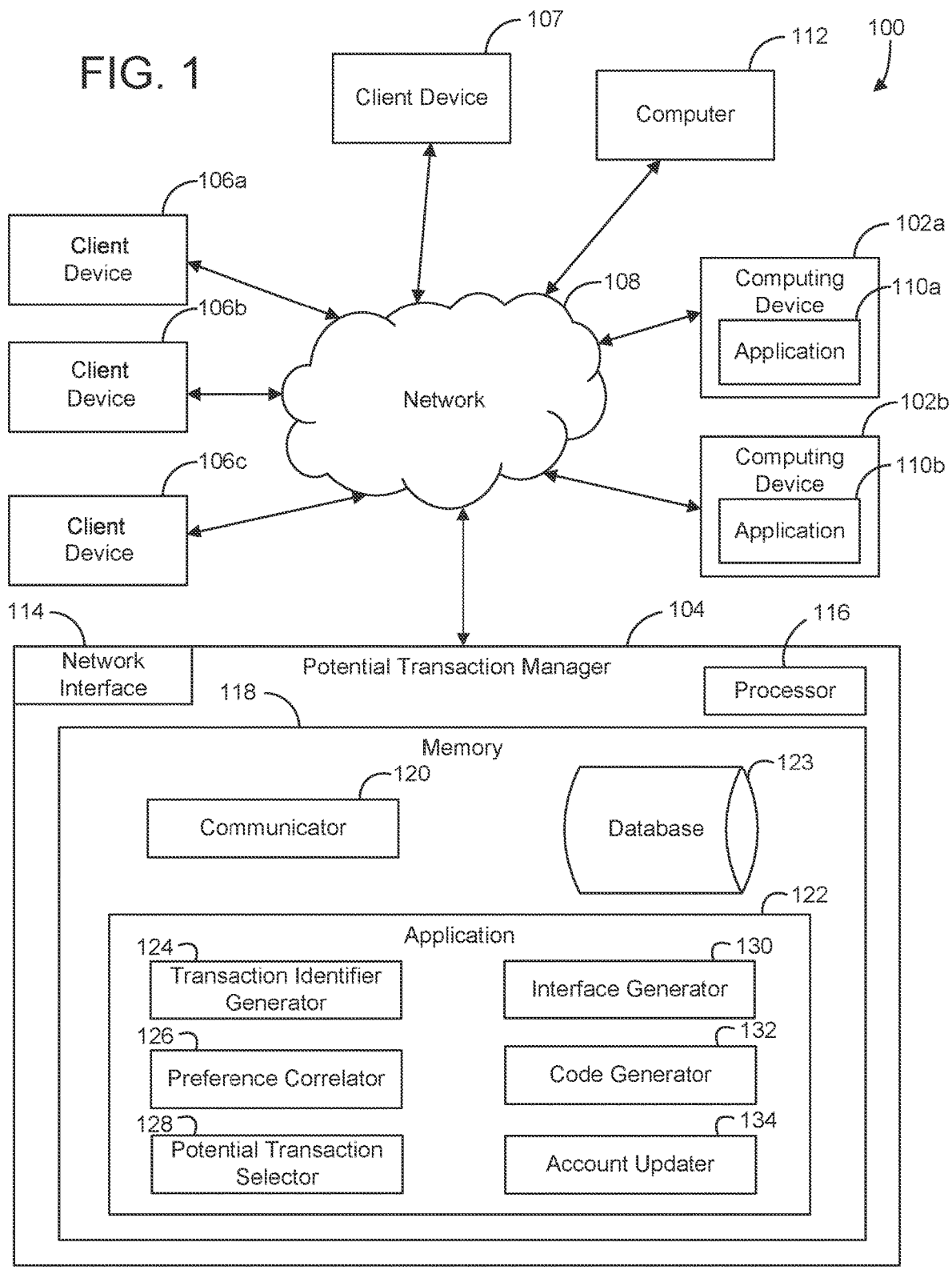
FIG. 1 is an illustration of an example system for targeted potential transaction delivery, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As previously mentioned, service providers that provide online goods or services may be limited in how they target their customers as browsers are increasingly restricting the use of tracking cookies to target different users to provide relevant content (e.g., different forms of digital data, such as video, images, audio, or audiovisual data). One area of the service industry that may be affected is restaurant owners that create promotions or deals for the food that the restaurants provide. Typically, restaurant owners may provide potential transactions (e.g., promotions) in promotion codes online through targeted content that is relevant to the individual users. However, without being able to use tracking cookies to provide relevant content, restaurant owners may be left without a means of providing promotion codes that are relevant to individual users.

To overcome the aforementioned technical deficiencies, a central server or a decentralized computing system of nodes maintaining a decentralized ledger (e.g., a blockchain) may operate as an intermediary device between computing devices of service providers and computing devices of individuals seeking to share data regarding potential transactions of the service providers. In doing so, the central server may provide an online platform through which computing devices of service providers and users of the online platform may communicate with the central server. Computing devices of the service providers may transmit potential transaction data (e.g., details for a potential transaction, a total value allocated to the potential transaction, an account value allocated to individual users who share the potential transaction, an identification of the potential transaction, a length or time period of the potential transaction, etc.) to the central server. The computing devices may do so by executing an application that is configured to communicate with the central server and transmitting the potential transaction data to the central server through the executed application. The central server may receive potential transaction data from multiple computing devices and store records of the potential transactions containing the potential transaction data for the potential transactions in a database. Users accessing computing devices (e.g., mobile computing devices) executing applications configured to communicate with the central server may view the potential transaction data for the potential transactions on a user interface provided by the central server. The central server may select which potential transactions to show the users based on historical transaction data of transactions performed by the users through the platform provided by the central server.

The users may select which potential transactions to share on platforms hosted by other computing devices. In some cases, users can restrict sharing of potential transactions when setting up the potential transactions through the central server. In such cases, users may not share the potential transactions. In response, the central server may generate and/or transmit account potential transaction codes for the selected potential transactions to the computing devices hosting the platform on which the potential transactions are being shared. In this way, the central server may operate as an intermediary computing device that can selectively provide relevant potential transactions to users that the users can then share on other platforms without the service providers using tracking cookies to generate relevant content for the potential transactions.

To determine which potential transactions to show an individual user for selection, the central server may analyze historical transaction data of transactions performed by the user through the platform provided by the central server. For example, a user may perform one or more transactions through the platform provided by the central server through an account the user has with the platform. In doing so, the central server can identify the types of services or products the user purchased in the transactions. The central server may maintain counters for the different types of services or products and increment the respective counters when the user completes transactions through the central server for products or services of the types of the counters. The central server can determine when the counters satisfy a condition (e.g., have a count exceeding a threshold) and write the types of the counters into the data structure of the account of the user through which the user performed the transactions. When the user logs into the platform provided by the central server, the central server can present a list of potential transactions that match or correspond to the same types of goods or services as the types of goods or services that are written into the user's account. Accordingly, the central server may provide relevant potential transactions to users without the central server or the service providers tracking personally identifiable data of the users.

Another technical problem that the central server may encounter when performing the process is ensuring that account potential transaction codes that the central server generates for individual users upon selection of potential transactions are unique. For example, responsive to receiving a selection of a potential transaction from a user, the central server may generate an account potential transaction code that the user may share on other platforms and that may be used when performing transactions through the platform hosted by the central server. The central server may attempt to generate account potential transaction codes that are unique to individual combinations of potential transaction and users to ensure that the central server updates the correct accounts for attribution when the account potential transaction code is later used to perform a transaction through the platform. However, given the character limits of the forms in which account potential transaction codes can be limited and/or given the randomness of conventional methods of generating random codes, such as using a random number generator, conventional systems may generate random codes that are common between different users and/or potential transactions, giving rise to errors of attribution in the use of the account potential transaction codes.

To overcome the aforementioned technical deficiencies, the central server may use an encoder to generate unique account potential transaction codes for individual users and potential transactions selected by the users. For example, upon receiving a selection of a potential transaction by a user, the central server may identify an account identifier of the account through which the user selected the potential transaction. The central server may also identify an identifier of the selected potential transaction. The central server may combine or concatenate the two identifiers to generate an account potential transaction code for the user and potential transaction. Because the account identifier of the account is unique to the account and the identifier of the selected potential transaction is unique to the potential transaction, the account potential transaction code that the central server generates may be unique and may not cross over with unrelated accounts and/or potential transactions. In this way, the central server can ensure provision of proper attribution when account potential transaction codes that the central server generates are used to complete transactions through the platform provided by the central server.

Potential Transaction Management System

FIG. 1 illustrates an example system 100 for targeted potential transaction delivery, in some embodiments. In brief overview, the system 100 can include computing devices 102a and 102b (together, computing devices 102, and individually, computing device 102), a potential transaction manager 104, client devices 106a-106c (together, client devices 106, and individually, client device 106), and a client device 107. The computing devices 102-107 can communicate over a network 108. The computing devices 102-107 can do so by exchanging messages with each other over the network 108. The computing devices 102 may transmit potential transaction data for potential transactions associated with the respective computing devices 102 to the potential transaction manager 104. The potential transaction manager 104 can present the potential transactions on user interfaces at the client devices 106. Users accessing the client devices 106 can select one or more of the potential transactions from the user interfaces. The potential transaction manager 104 can receive the selection and generate account potential transaction codes using identifiers of the selected potential transactions and identifiers of the accounts through which the potential transactions were selected. The potential transaction manager 104 can transmit the generated account potential transaction codes to public computing devices that host online public platforms (e.g., social media platforms) for display. The potential transaction manager 104 can receive the account potential transaction codes and facilitate transactions with the computing devices 102 associated with the account potential transaction codes. The potential transaction manager 104 can update accounts and/or data structures that correspond with the used account potential transaction codes responsive to completing transactions using the account potential transaction codes. The system 100 may include more, fewer, or different components than shown in FIG. 1. For example, there may be any number of client devices or computers that make up or are a part of the potential transaction manager 104 or networks in the system 100.

The computing devices 102, the potential transaction manager 104, the client devices 106, and/or the client device 107 can each include or execute on one or more processors or computing devices and/or communicate via the network 108. The network 108 can include computer networks such as the Internet, local, wide, metro, or other area networks, intranets, satellite networks, and other communication networks such as voice or data mobile telephone networks. The network 108 can be used to access information resources such as web pages, websites, domain names, or uniform resource locators that can be presented, output, rendered, or displayed on at least one computing device (e.g., the computing devices 102, the client devices 106, and the client device 107), such as a laptop, desktop, tablet, personal digital assistant, smartphone, portable computers, speaker, smart watch, augmented reality/virtual reality, Internet-of-things device, vehicle, or any other device. For example, via the network 108, a computing device 102 can transmit data for a potential transaction to the potential transaction manager 104. The potential transaction manager 104 can present the potential transaction data on a user interface that the potential transaction manager 104 transmits to a client device 106.

The computing devices 102, the potential transaction manager 104, the client devices 106, and/or the client device 107 can each include or utilize at least one processing unit or other logic devices such as a programmable logic array engine or a module configured to communicate with one another or other resources or databases. As described herein, computers can be described as computers, computing devices, or client devices. The computing devices 102, the client devices 106, and/or the client device 107 may each contain a processor and a memory. The components of the computing devices 102, the potential transaction manager 104, the client devices 106, and/or the client device 107 can be separate components or a single component. The system 100 and its components can include hardware elements, such as one or more processors, logic devices, or circuits.

Each of the computing devices 102 may be computing devices that operate or otherwise correspond to different service providers, such as restaurants. The computing devices 102 can respectively store and/or execute applications 110a-b (together, the applications 110, and separately, the application 110). The applications 110 can be or include application programming interfaces (APIs) that facilitate communication between the computing devices 102 and the potential transaction manager 104. The applications 110 can operate as a portal through which users of the computing devices 102 can access a platform (e.g., an electronic platform) provided by the potential transaction manager 104. For example, a user may have an account with the platform that the user may access through an application 110 being executed by a computing device 102. The user may input details regarding a potential transaction at a place of operation (e.g., a restaurant of the computing device 102). The application 110 can receive the potential transaction data and transmit the potential transaction data to the potential transaction manager 104. The potential transaction manager 104 can receive and store the potential transaction data in memory. Any number of computing devices 102 can receive and transmit potential transaction data to the potential transaction manager 104 for storage.

The client devices 106 may be computing devices that are accessed by individuals. The client devices 106 can be any type of portable or non-portable computing device. Examples of portable computing devices include, but are not limited to, smartphones tables, laptop computers, wearable devices, such as smart watches, and other handheld digital devices. Examples of non-portable computing devices include desktop computers, workstations, servers, mainframes, supercomputers, and game consoles. The client devices 106 can each store and execute an application (e.g., an application similar to or the same as the applications 110) that facilitates communication with the potential transaction manager 104. Users of the client devices 106 may access the platform provided by the potential transaction manager 104 to view different potential transactions that have been uploaded to the potential transaction manager 104 by the computing devices 102. Users can select potential transactions for sharing and the potential transaction manager 104 can transmit the selected potential transactions to one or more servers or computing devices (e.g., servers or computing devices that host social media websites, such as a computer 112) for display. In one example, a user may be an influencer. The user may access a client device 106 and select a potential transaction presented by the potential transaction manager 104 and/or select an option to share the potential transaction on a first social media website. Upon receiving the selection, the potential transaction manager 104 can transmit data of the selected potential transaction to the computer 112 hosting the first social website. The computer hosting the first social website may display the data of the potential transaction on an account associated with the user.

The potential transaction manager 104 may comprise one or more processors that are configured to host and manage a platform for potential transactions provided by different service providers. The potential transaction manager 104 can receive potential transaction data of potential transactions from the computing devices 102 and display the potential transaction data at the client devices 106. Users accessing the client devices 106 may select which potential transactions to share and the potential transaction manager 104 can generate account potential transaction codes for each selection and share the generated potential transaction codes. The potential transaction manager 104 may comprise a network interface 114, a processor 116, and/or memory 118. The potential transaction manager 104 may communicate with the computing devices 102, the client devices 106, the client device 107, and/or the computer 112 via the network interface 114, which may be or include an antenna or other network device that enables communication across a network and/or with other devices. The processor 116 may be or include an ASIC, one or more FPGAs, a DSP, circuits containing one or more processing components, circuitry for supporting a microprocessor, a group of processing components, or other suitable electronic processing components. In some embodiments, the processor 116 may execute computer code or modules (e.g., executable code, object code, source code, script code, machine code, etc.) stored in memory 118 to facilitate the activities described herein. Memory 118 may be any volatile or non-volatile computer-readable storage medium capable of storing data or computer code.

The memory 118 may include a communicator 120, an application 122, and/or a database 123, in some embodiments. The communicator 120 may comprise programmable instructions that, upon execution, cause the processor 116 to communicate with the computing devices 102, the client devices 106, the client device 107, and/or the computer 112. The communicator 120 may be or include an application programming interface (API) that facilitates communication between the potential transaction manager 104 and other computing devices. The communicator 120 may communicate with the computing devices 102, the client devices 106, the client device 107, and/or the computer 112 across the network 108.

The communicator 120 can establish connections with the computing devices 102, the client devices 106, the client device 107, and/or the computer 112. The communicator 120 can establish the connections with the computing devices 102, the client devices 106, the client device 107, and/or the computer 112 over the network 108. To do so, the communicator 120 can communicate with the computing devices 102, the client devices 106, the client device 107, and/or the computer 112 across the network 108. In one example, the communicator 120 can transmit syn packets to the computing devices 102, the client devices 106, the client device 107, and/or the computer 112 and establish the connections using a TLS handshaking protocol. The communicator 120 can use any handshaking protocol to establish connections with the computing devices 102, the client devices 106, the client device 107, and/or the computer 112.

The application 122 may comprise programmable instructions that, upon execution, cause the processor 116 to host and provide a platform on which users of the computing devices 102 can provide data of potential transactions, users of the client devices 106 can select potential transactions to share, and users of computing devices, such as the client device 107, can complete transactions using account potential transaction codes generated by the application 122. The application 122 can include a transaction identifier generator 124, a preference correlator 126, a potential transaction selector 128, an interface generator 130, a code generator 132, and/or an account updater 134. In brief overview, the components 124-134 may cooperate to generate transaction identifiers for individual potential transactions received from the computing devices 102. The components 124-134 may select potential transactions to present to a user at a client device 106. The components 124-134 can present the selected potential transactions on a user interface at the client device 106 and receive a selection of one of the presented potential transactions. The components 124-134 can generate an account potential transaction code based on the potential transaction identifier for the selected potential transaction and an identifier of the account of the user that selected the potential transaction. The components 124-134 can transmit the generated account potential transaction code to the computer 112. The components 124-134 can receive, from the client device 107, a transaction request for a transaction that includes the generated account potential transaction code. Responsive to receiving the transaction request, the components 124-134 can update the account of the user for which the components 124-134 generated the account potential transaction code to indicate the transaction.

The transaction identifier generator 124 may comprise programmable instructions that, upon execution, cause the processor 116 to generate potential transaction identifiers for potential transactions. The potential transaction identifiers may be identifiers that individually identify different potential transactions that service providers are offering. The potential transaction identifiers may each be a string of a defined number of numeric values, alphanumeric values, and/or symbols. The transaction identifier generator 124 may generate potential transaction identifiers upon receiving potential transaction data for potential transactions. For example, the transaction identifier generator 124 can receive potential transaction data for a potential transaction from a computing device 102 (e.g., via an application executing on the computing device 102). Responsive to receiving the potential transaction data, the transaction identifier generator 124 can automatically generate a potential transaction identifier for the potential transaction. The transaction identifier generator 124 can generate the potential transaction identifier to be unique to the potential transaction.

The transaction identifier generator 124 can use one or more techniques to generate the potential transaction identifier for the potential transaction. In some embodiments, the transaction identifier generator 124 can execute a random number generator to generate the potential transaction identifier. The transaction identifier generator 124 can receive the potential transaction data and execute the random number generator to generate a potential transaction identifier having a defined number of values for the potential transaction. In some embodiments, the transaction identifier generator 124 can use a counter to generate the potential transaction identifier. For example, the transaction identifier generator 124 can maintain a counter (e.g., a potential transaction identifier counter) and increment the counter for each potential transaction identifier that the transaction identifier generator 124 generates. The counter can be a base-36 counter or a base-62 counter such that incrementing the counter can generate alphanumeric values (e.g., upper case letters in combination with numbers, lower case letters in combination with numbers, or upper case letters and lower case letters in combination with numbers). The counter can have a defined number of values (e.g., four values, such that the number one for the counter would be "0001"). The transaction identifier generator 124 can increment the counter for each potential transaction identifier that the transaction identifier generator 124 generates. The incremented value can be the potential transaction identifier for the potential transaction. The transaction identifier generator 124 can reset the counter upon reaching the limit of the counter. In some embodiments, the counter may not have a defined number of values and may instead increment over time without hitting a limit.

In some embodiments, the transaction identifier generator 124 can generate potential transaction identifiers based on potential transaction data of the individual potential transactions. For example, the transaction identifier generator 124 can parse the potential transaction data of the potential transaction for different keywords. Examples of such keywords can include, but are not limited to, pizza, hamburger, two-for-one, special, dollars off, etc. The transaction identifier generator 124 can identify one or more of the keywords from the potential transaction data for the potential transaction and generate a potential transaction identifier from the one or more keywords. The transaction identifier generator 124 can do so, for example, by setting the one or more keywords themselves as the potential transaction identifier, setting abbreviations of the keywords (which the transaction identifier generator 124 may determine based on mappings between the keywords and the abbreviations in a stored table or database), or by performing a function (e.g., a hashing function or any other function) on the one or more keywords. The transaction identifier generator 124 can generate potential transaction identifiers for potential transactions using any method. In some embodiments, the computing devices 102 may independently generate the potential transaction identifiers for the potential transactions (e.g., using the same methods as the transaction identifier generator 124 or from a user input) and include the potential transaction identifiers in the potential transaction data for the potential transactions. In such embodiments, the transaction identifier generator 124 may generate the potential transaction identifiers by identifying the potential transaction identifiers from the potential transaction data. The transaction identifier generator 124 can generate potential transaction identifiers for any number of potential transactions. The transaction identifier generator 124 can store potential transaction identifiers that the transaction identifier generator 124 generates in the database 123.

The database 123 can be a relational or graphical database that is configured to store records or data structures for individual potential transactions. Each record (e.g., a file, document, table, listing, message, notification, etc.) or data structure (e.g., a table with different rows and/or columns)

can include potential transaction data of the potential transaction of the record or data structure. The individual records or data structure can include different field-value pairs for different characteristics of the potential transactions. For example, a data structure for a potential transaction can include a field-value pair for the potential transaction identifier for the potential transaction, a maximum value of the potential transaction, a current value of the potential transaction, a description of the potential transaction (e.g., a description in plain text), a length or time period of the potential transaction, a list of users who have shared an account potential transaction code for the potential transaction, a list of transactions that were performed via the platform for the potential transaction, etc. The data structure can include any amount of data for the potential transaction. The transaction identifier generator 124 can generate records or data structures for potential transactions with potential transaction data that the potential transaction manager 104 receives from the computing devices 102 as the potential transaction manager 104 receives the potential transaction data. In doing so, the potential transaction manager 104 can generate potential transaction identifiers for the individual potential transactions and insert the potential transaction identifiers into the records or data structures of the potential transactions for which the transaction identifier generator 124 generated to the potential transaction identifiers.

In some embodiments, the transaction identifier generator 124 can determine and/or insert types of transactions of the potential transactions received from the computing devices 102 into the records or data structures of the potential transactions. Types of transactions can be transactions for certain types of products (e.g., certain types of food, such as pizza, hamburger, lunch, dinner, breakfast, dessert, snack, candy, ice cream, Mexican food, Chinese food, etc.; retail promotions; automaker promotions; television promotions; etc.) and/or services (e.g., a business could use an hourly rate or a completion of a service as a transaction). In some embodiments, the computing devices 102 can include identifiers of one or more types of transactions in the potential transaction data for the potential transactions. In some embodiments, the transaction identifier generator 124 can determine the types of transactions of the potential transactions as the transaction identifier generator 124 receives the potential transaction data for the potential transactions. The transaction identifier generator 124 can parse the potential transaction data searching for keywords in the description of the potential transactions (e.g., the description of the items purchased or the service provider from which the items were purchased). The transaction identifier generator 124 can identify values within the potential transaction data of potential transactions and compare the values with field-value pairs in a database (e.g., the database 123). The transaction identifier generator 124 can identify field-value pairs with matching values to values extracted from potential transaction data of a potential transaction and identify the types of transactions of the field-value pairs. The transaction identifier generator 124 can assign the identifiers of types of transactions to the potential transactions with matching values. The transaction identifier generator 124 can assign the identifiers of the types of transactions to the corresponding potential transactions by storing the identifiers of the types of transactions into the records or data structures of the potential transactions for which the transaction identifier generator 124 determined the types of transactions.

In some embodiments, the database 123 can include records or data structures for individual accounts (e.g., user accounts). The records or data structures can include data for individual user accounts, such as account identifiers (e.g., numeric or alphanumeric values) that are unique to the individual user accounts, the names of the account holders, demographic data of the account holders, links to social media web pages of the account holders, a list of active potential transactions that the users of the accounts have selected for sharing, a list of all of the potential transactions that the users of the accounts have selected for sharing, a count of the number of instances in which shared account potential transaction codes generated for the account have been used to perform transactions, etc. The account identifiers can be generated (e.g., the by the potential transaction manager) in a similar manner to the potential transaction identifiers upon creation of the individual accounts through the platform. The records or data structures can store any amount or type of data regarding the individual accounts.

In some embodiments, the data structures or records of the accounts can include historical transaction data of transactions performed through the accounts. For example, the potential transaction manager 104 can facilitate transactions with the service providers associated with the respective computing devices 102. The potential transaction manager 104 can do so through the platform that the potential transaction manager 104 provides. In doing so, users of the client devices 106 can access the platform and browse through interfaces that include lists (e.g., menus) of different products or services that the users can purchase from the service providers. The users can select individual products or services to add the products or services to a cart maintained by the potential transaction manager 104 (e.g., maintained using session cookies). The potential transaction manager 104 can maintain the products or services in the cart for a user until the user "checks out" and purchases the products or services in the cart. Upon receiving a selection to complete the purchase, the potential transaction manager 104 can communicate the transaction data of the purchases to the computing devices 102 of the service providers from which the users are purchasing the products or services. The service provider may receive the transaction data and complete the transaction with the user. The potential transaction manager 104 can insert the transaction data (e.g., products or services purchased, the amount of the transaction, individualized amounts of the transaction, an identifier of the service providers from which the products or services were purchased, a time in which the user checked out, a time in which the service provider completed the transaction, etc.). The potential transaction manager 104 can similarly store transaction data for transactions performed through any number of accounts and/or with any number of service providers.

The preference correlator 126 may comprise programmable instructions that, upon execution, cause the processor 116 to determine account preferences for individual accounts stored in the database 123. The preference correlator 126 can monitor the transactions that the accounts stored in the database 123 perform (e.g., the users perform through their respective accounts) over time. The preference correlator 126 can do so, for example, based on the types of the transactions. For example, the preference correlator 126 can determine types of transactions for the transactions that a user account performs through the platform of the potential transaction manager 104. The types of transactions can be the same types of transactions as described above. The preference correlator 126 can determine one or more types of transactions for each transaction based on the product purchased in the transaction. For example, if a transaction was a purchase for pizza for dinner, the preference correlator 126 can determine and/or assign the types of pizza and dinner to the transaction. In some embodiments, the preference correlator 126 can determine types of transactions based on the service providers of the transactions. For example, if a transaction was a purchase from a hot dog stand, the preference correlator 126 can determine a type of transaction for the transaction to be hot dog stand. The preference correlator 126 can determine the types by analyzing the individual items of the transaction and/or the name of the service provider of the transaction. The preference correlator 126 can compare the values of the individual items and/or the names of the service provider to a database (e.g., the database 123) that includes field-value pairs matching the values with types of transactions. The preference correlator 126 can identify matching values to the values of transactions to assign one or more types of transactions to the individual transactions. The preference correlator 126 can use any method to determine types of transactions for transactions performed by users of the platform.

The preference correlator 126 can correlate the types of transactions with individual accounts stored in the database 123. For example, for each account, the preference correlator 126 can maintain a counter for each of a plurality of types of transactions. The preference correlator 126 can determine types of transactions for the individual types of transactions that the account performs through the platform of the potential transaction manager 104. The preference correlator 126 can compare the counts of the counters to a threshold or thresholds (e.g., the same threshold for every counter or thresholds that are specific to the individual counters). The thresholds may be stored in memory. The preference correlator 126 can identify counters with counts that exceed the threshold or thresholds to which the counters were compared. The preference correlator 126 can identify the types of transactions of the counters and store identifiers of the types of transactions in data structures of the accounts that correspond with the individual transactions. The preference correlator 126 can store any number of identifiers of types of transactions in data structures of any number of accounts. The correlated types of transactions can be determined preferences of the accounts.

The preference correlator 126 can use one or more other conditions to correlate types of transactions with individual accounts. For example, instead of correlating a type of transaction with an account responsive to the counter for the type of transaction exceeding a threshold at one instance in time, the preference correlator 126 can determine whether the counter exceeds the threshold for a length of time exceeding a threshold. Over time, the preference correlator 126 can decrement the count for increments that became stale (e.g., occurred a set time length prior to the current time) and continue incrementing the counter as described above. The preference correlator 126 can correlate the type of transaction of the counter with the account of the counter responsive to determining the counter has a count exceeding the threshold (e.g., count threshold) for a duration of time exceeding a threshold (e.g., a time threshold). The preference correlator 126 can correlate types of transactions with accounts using any number of methods.

The preference correlator 126 can remove identifications of types of accounts from the data structures of the accounts. For example, the preference correlator 126 can decrement the counters of accounts over time as described above. Responsive to determining a decrement causes a counter to be below a threshold (e.g., the same threshold with which the preference correlator 126 compared the count of the counter or a different threshold), the preference correlator 126 can remove the identification of the type of transaction associated with the counter from a data structure of an account. The preference correlator 126 can remove identifications of types of accounts from data structures of accounts in any manner. By doing so, the preference correlator 126 can dynamically change preferences of users' accounts as the users' preference change over time.

The potential transaction selector 128 may comprise programmable instructions that, upon execution, cause the processor 116 to select potential transactions to show to users of the client devices 106. The potential transaction selector 128 can select potential transactions to show to a user responsive to receiving a request from a client device 106 the user is accessing. For example, a client device 106 can establish a connection with the potential transaction manager 104. The client device 106 can do so through an application executing on the client device 106 that communicates with the application 122, such as through the communicator 120 of the potential transaction manager 104. The client device 106 can establish the connection through an account that the user accessing the client device 106 has that is stored in the database 123.

Upon establishing the connection with the potential transaction manager 104, the user interface generator 130 can generate a user interface for the application 122. The user interface generator 130 may comprise programmable instructions that, upon execution, cause the processor 116 to generate and update user interfaces as users of the application 122 access the platform provided by the potential transaction manager 104. The user interface generator 130 can transmit an account page to the client device 106 upon the user of the client device 106 successfully logging in to the platform. The user can select an option on the user interface to view different potential transactions. Responsive to the selection, the potential transaction selector 128 can identify or select potential transactions that may be relevant to the user and display the selected potential transactions on the user interface at the client device 106.

The potential transaction selector 128 can select a subset of potential transactions to show the user on the client device 106. The potential transaction selector 128 can do so based on the types of transactions that have been correlated with the account of the user and with the potential transactions. For example, the potential transaction selector 128 can identify the identifiers of the types of transactions that are stored in the data structure of the account of the user that made the selection to view potential transactions on the platform. The potential transaction selector 128 can query the data structures or records of the potential transactions in the database 123 for records that contain at least one matching identifier of a type of transaction with the types of transactions of the user's account (e.g., records of potential transactions that satisfy a selection policy that includes one or more rules for selecting potential transactions for display). The potential transaction selector 128 can identify or select the records or data structures of the potential transactions with at least one matching identifier of a type of transaction to select the subset of potential transactions to show the user on the client device 106.

The user interface generator 130 can present the selected subset of potential transactions at the client device 106. For example, the user interface generator 130 can retrieve potential transaction data (e.g., a description of the potential transaction, an image of the product or item of the potential transaction, a duration or time period of the potential transaction, etc.) of the selected subset of potential transactions from the records of the potential transactions. The user interface generator 130 can include the potential transaction data of the individual potential transactions in a list form on a user interface. In some embodiments, the user interface generator 130 may do so by inserting the separate potential transaction data in separate widgets that each correspond with a different potential transaction of the subset of potential transactions. The user interface generator 130 can transmit the user interface to the client device 106 for display to present the potential transaction data on a user interface at the client device 106. In some embodiments, instead of only including the subset of potential transactions, the user interface generator 130 can include all of the potential transactions that are stored in the database 123 in the user interface.

The user accessing the client device 106 can select a potential transaction from the user interface. For example, the user accessing the client device 106 can view the list of potential transactions on the user interface. The user can select one of the potential transactions from the user interface. The user can do so by providing an input via an input/output device (e.g., a touch interface, a mouse, a keyboard, etc.) selecting the potential transaction. In response to the selection, the client device 106 can transmit an indication of the selected potential transaction to the potential transaction manager 104.

The code generator 132 may comprise programmable instructions that, upon execution, cause the processor 116 to generate account potential transaction codes for selected potential transactions. Account potential transaction codes can be values or strings (e.g., numeric or alphanumeric strings) that are unique to a combination of a user and a selected potential transaction. The account potential transactions can be used by other users of the platform to perform transactions to obtain the benefits of the potential transactions for which the used account potential transaction codes were generated.

The code generator 132 can generate account potential transaction codes for potential transactions that were selected by users viewing selected potential transactions through their accounts. For example, responsive to the user selecting a potential transaction from the user interface generated by the user interface generator 130, the code generator 132 can generate an account potential transaction code for (e.g., that is unique to) the potential transaction and account of the user. The code generator 132 can do so, for example, by identifying an account identifier of the user's account and the potential transaction identifier of the selected potential transaction. The code generator 132 can combine the account identifier with the potential transaction identifier to generate an account potential transaction code for the account and potential transaction. In some embodiments, the code generator 132 can concatenate the account identifier of the user's account with the potential transaction identifier of the selected potential transaction to generate the account potential transaction code. In some embodiments, the code generator 132 may only concatenate a portion (e.g., all or less than all) of the potential transaction identifier with a portion of the account identifier to generate the account potential transaction code. Because the account identifier is unique to the user's account and the potential transaction identifier is unique to the potential transaction, the combination of the two identifiers generates a unique account potential transaction code that will not overlap with any other account potential transaction codes that the code generator 132 generates. Using this method can ensure higher security of the account potential transaction codes than other methods of generating unique values that may result in overlap between each other. The code generator 132 can generate the account potential transaction code and store the account potential transaction code in the user's account and/or the record or data structure of the potential transaction. The code generator 132 can similarly generate any number of account potential transaction codes for selected potential transactions. The code generator 132 can store the account potential transaction codes for an account in the data structure of the account, in some cases with other potential transaction data of the potential transactions of the account potential transaction codes. The account potential transaction codes and/or the potential transaction data of the potential transactions selected for the account can be stored as a list of potential transactions for which an account potential transaction code has been generated for the account.

In some embodiments, users can create their own account potential transaction code. A user can do so, for example, by combining an account identifier of an account the user has with a social media website with a potential transaction data of a potential transaction (e.g., the potential transaction identifier, the potential transaction expiration date, etc.). The code generator 132 can receive such data as input and generate the account potential transaction codes based on the input. The code generator 132 can store the account potential transaction codes in the data structure of the accounts for which the code generator 132 generated the account potential transaction codes.

The code generator 132 can restrict users from generating account potential transaction codes that are already stored in the database 123. For example, upon receiving or generating an account potential transaction code, the code generator 132 can query the database 123 for stored account potential transaction codes that match the generated account potential transaction code. Responsive to identifying a match, the code generator 132 can generate and transmit an alert to the computing device being accessed by the user for which the code generator 132 generated the account potential transaction code. The alert may indicate that the account potential code was already in use and for the user to select or input other data to generate the account potential transaction code. This process can repeat until the code generator 132 generates an account potential transaction code that is not currently stored in the in the database 123.

The potential transaction manager 104 can transmit the account potential transaction code to the computer 112. The potential transaction manager 104 can transmit the account potential transaction code to the computer 112 in response to receipt of an input from the client device 106 indicating to transmit the account potential transaction to the computer 112. For example, when the user selects the potential transaction from the user interface, the user may also select an option at the user interface to share an account potential transaction code on a website hosted by another computing device, such as the computer 112. In some cases, the user can select an option indicating with whom the account potential transaction code can be shared and/or the websites on which to share the account potential transaction code. The other computing device may host a social media platform through which the user may post different messages or pictures. The user may select the social media platform hosted by or otherwise associated with the computer 112 to share the account potential transaction code to share on the social media platform. In some cases, the user may type in a text message and/or select a picture to include when sharing the account potential transaction code on the social media platform. The potential transaction manager 104 can identify an identification (an internet protocol (IP) address or a uniform resource locator (URL)) of the computer 112 based on the selection of the social media website associated with the computer 112. The potential transaction manager 104 can use the identification of the computer 112 to establish a connection with the computer 112. The potential transaction manager 104 can transmit the message containing any inputs by user and the account potential transaction code to the computer 112 over the connection. The computer 112 can display the message and/or account potential transaction code on the social media platform (e.g., on the user's profile on the social media platform) hosted by the computer 112.

Subsequent to transmitting the account potential transaction code to the computer 112, the potential transaction manager 104 can receive a transaction request for a transaction. The transaction request can include the transaction request comprising the account potential transaction code that the potential transaction manager 104 transmitted to the computer 112. The potential transaction manager 104 can receive the transaction request from the client device 107. For example, the client device 107 can execute an application that is configured to communicate with the application 122 (e.g., via the communicator 120) of the potential transaction manager 104. A user of the client device 107 can view a user interface (e.g., a user interface generated by the user interface generator 130) of the application that includes different pages for different service providers of the computing devices 102. Through the user interface, the user can provide inputs of transaction data of a transaction with the service provider for which the code generator 132 generated the account potential transaction code. The user can input the account potential transaction code (which the user may have seen on the social media website of the user that initially selected the potential transaction or another website or piece of digital content) into a form of the user interface dedicated to receiving such account potential transaction codes. The potential transaction manager 104 can receive the inputs of the transaction and identify the account potential transaction code. The potential transaction manager 104 can transmit a message containing the transaction data to the computing device 102 associated with the account potential transaction code. The service provider associated with the computing device 102 can receive the transaction data and complete the transaction with the user who input the transaction data and the account potential transaction code.

The account updater 134 may update the user's account based on the transaction. The account updater 134 may comprise programmable instructions that, upon execution, cause the processor 116 to update accounts of users who complete transactions through the platform of the potential transaction manager 104 and/or the records or data structures of potential transactions associated with the completed transactions. The account updater 134 may update accounts to indicate transactions were performed using account potential transaction codes that the potential transaction manager 104 generated for the accounts. For example, responsive to receiving the account potential transaction code for the transaction performed through the client device 107, the account updater 134 can query the database 123 for a record or data structure of an account that contains the account potential transaction code. The account updater 134 can identify the record or data structure of an account of the user of the client device 106 that selected the potential transaction that caused generation of the account potential transaction code based on the query. Responsive to doing so, the account updater 134 can insert the transaction data (e.g., the account potential transaction code, the time of the transaction, and/or any other data) of the transaction in the record or data structure. The account updater 134 can additionally or instead increment a counter in the data structure that indicates each instance in which the account potential transaction code is used to perform a transaction. The account updater 134 can additionally or instead update a different counter that indicates each instance in which any account potential transaction code of the account is used to perform a transaction. In some embodiments, the account updater 134 can update the account to indicate the total value of transactions that are performed through account potential transaction codes of the account. The account updater 134 can update data of the account based on the transaction in any manner.

In some embodiments, the account updater 134 can validate or authenticate different users of the platforms based on the transactions the users perform through the platform. For instance, the account updater 134 can validate the account of the user of the client device 107 based on the transaction request that the client device 107 transmitted to the account updater 134. For instance, the account updater 134 can identify the account of the user (e.g., based on the user submitting the transaction request through the account). The account updater 134 can receive an indication that the transaction performed by the user was completed (e.g., the user's payment went through or was settled). The account updater 134 can determine the transaction was completed (e.g., based on receipt of the indication, based on the potential transaction manager 104 transmitting the message containing the transaction data to the computing device, or based on any other condition being satisfied). Responsive to determining the account was completed, account updater 134 may insert a flag in the account of the user for which the account was completed. The flag may indicate validation of the user's account. In validating accounts in this way, the account updater 134 may differentiate between accounts that are owned by malicious users (e.g., hackers or owners of account bots that may seek to perform an attack on the platform or otherwise spam the platform) and accounts that are owned and operated by individuals seeking to perform transactions.

In some embodiments, the account updater 134 can allow service providers to restrict how different account potential transaction codes are used. For example, when a computing device 102 of a service provider transmits potential transaction data to the potential transaction manager 104, the service provider may include a limit (e.g., an account potential transaction value) to the value of the potential transaction in the potential transaction data. The limit may indicate a maximum aggregate value of transactions that may be performed using individual account potential transaction codes generated for the potential transaction. The transaction identifier generator 124 can insert the limit to the value of the potential transaction in the data structure or record of the accounts for which the account potential transaction codes were generated. In this way, the transaction identifier generator 124 can assign the limit to account potential transaction codes and give service providers the ability to control use of the account potential transaction codes.

The account updater 134 can monitor the use of an account potential transaction code. To do so, the account updater 134 can store a counter corresponding to the account potential transaction code in the data structure of the account storing the account potential transaction code. The account updater 134 can increment the counter at each instance that the account potential transaction code is used to perform a transaction. The account updater 134 can increment the counter by a defined value (e.g., one) or by the amount (e.g., the transaction value) of each respective transaction. For each increment, the account updater 134 can compare the value of the counter to a threshold (e.g., a predetermined threshold). Responsive to determining the value exceeds the threshold, the account updater 134 can insert a flag (e.g., a restriction tag) into the data structure of the account. The flag can indicate that the account potential transaction code is expired. Accordingly, when the potential transaction manager 104 subsequently receives a transaction request containing the account potential transaction code, the account updater 134 can identify the flag for the account potential transaction code and restrict the account potential transaction code from being used in the transaction.

In one example, the potential transaction manager 104 can receive a transaction request that includes the account potential transaction code. The potential transaction manager 104 can query the account storing the account potential transaction code and identify the flag in the account data structure. In response to identifying the flag, the potential transaction manager 104 can transmit a message to the client device indicating the account potential transaction code cannot be used. The potential transaction manager 104 can transmit a message to the client device that initially transmitted the transaction request indicating the account potential transaction code cannot be used. The client device may display the message on a display of the client device and the user accessing the client device may select an option to complete the transaction without the account potential transaction code or to discard (e.g., not perform) the transaction. The client device may transmit the selection to the potential transaction manager 104, and the potential transaction manager 104 can operate accordingly (e.g., complete the transaction without the account potential transaction code or not complete the transaction according to the selection).

In some embodiments, the potential transaction manager 104 may not let the counter for a potential transaction code exceed a limit set for the account potential transaction code. For example, for each transaction request that the potential transaction manager 104 receives that includes the account potential transaction code, the potential transaction manager 104 can determine or predict a value (e.g., a count) of the counter for the account potential transaction code if the transaction were to be completed. The potential transaction manager 104 can compare the predicted value to a threshold as described above. Responsive to determining the predicted value exceeds the threshold, the account updater 134 can insert a flag into the data structure or record of the account indicating the account potential transaction code has expired. Based on the flag, the potential transaction manager 104 can complete the transaction and not complete future transactions based on the account potential transaction code or may not complete the transaction and send back a message indicating the account potential transaction code is not valid.

The account updater 134 can determine account potential transaction codes are expired for any reason. In one example, a service provider may assign a time limit, a time period, or a set duration to a potential transaction. The time limit, time period, or set duration may be included in the potential transaction data of the potential transaction. The account updater 134 can assign the time limit, time period, or duration to each account potential transaction code that the code generator 132 generates for the potential transaction and include the time limit, time period, or duration in the account data structures storing the account potential transaction codes that are generated for the potential transaction. The account updater 134 can determine when the time limit, time period, or set duration is over and insert flags in the data structures of the accounts storing the account potential transaction codes indicating the account potential transaction codes are expired. In some cases, the time limits, time periods, or set durations may be specific to individual account potential transaction codes (e.g., based on the time of selection and generation of the individual account potential transaction codes). In such cases, the account updater 134 can determine when the time limits, time periods, or durations are over and insert flags in the data structures of the accounts storing the expired account potential codes accordingly.

In some embodiments, a service provider can include a limit for a potential transaction in the potential transaction data for the potential transaction. The limit may indicate a total number of transactions, a total value (e.g., a potential transaction value) of transactions that may be performed for the potential transaction, a total amount allocated for the potential transaction. In such embodiments, the service provider can provide an input indicating the limit into a computing device 102 with other potential transaction data. The computing device 102 may transmit the limit with the other potential transaction data to the potential transaction manager 104. The potential transaction manager 104 can receive the limit in the potential transaction data and the transaction identifier generator 124 can include the limit in the record or data structure for the potential transaction. In this way, the transaction identifier generator 124 can assign the limit to potential transactions and give service providers the ability to control use of potential transactions.

The account updater 134 can monitor the use of account potential transaction codes generated for the potential transaction. To do so, the account updater 134 can store a counter corresponding to the potential transaction in the data structure for the potential transaction. The account updater 134 can increment the counter at each instance that an account potential transaction code for the potential transaction is used is used to perform a transaction. The account updater 134 can increment the counter by a defined value (e.g., one) or by the amount (e.g., the transaction value) of each respective transaction. For each increment, the account updater 134 can compare the value of the counter to a threshold (e.g., a predetermined threshold). Responsive to determining the value exceeds the threshold, the account updater 134 can insert a flag (e.g., a restriction tag) into the data structure of the potential transaction. The flag can indicate that the potential transaction is expired. Accordingly, when the potential transaction manager 104 subsequently receives a transaction request containing an account potential transaction code generated for the potential transaction, the account updater 134 can identify the flag for the potential transaction and restrict the account potential transaction code for the potential transaction from being used in the transaction.

In one example, the potential transaction manager 104 can receive a transaction request that includes an account potential transaction code for the potential transaction. The potential transaction manager 104 can query the data structure storing potential transaction data for the potential transaction and identify the flag in the data structure. In response to identifying the flag, the potential transaction manager 104 can transmit a message to the client device indicating the account potential transaction code cannot be used. The potential transaction manager 104 can transmit a message to the client device that initially transmitted the transaction request indicating the account potential transaction code cannot be used. The client device may display the message on a display of the client device and the user accessing the client device may select an option to complete the transaction without the account potential transaction code or to discard (e.g., not perform) the transaction. The client device may transmit the selection to the potential transaction manager 104, and the potential transaction manager 104 can operate accordingly (e.g., complete the transaction without the account potential transaction code or not complete the transaction according to the selection).

In some embodiments, the potential transaction manager 104 may not let the counter for a potential transaction exceed a limit set for the potential transaction. For example, for each transaction request that the potential transaction manager 104 receives that includes an account potential transaction code for the potential transaction, the potential transaction manager 104 can determine or predict a value (e.g., a count) of the counter for the potential transaction if the transaction were to be completed. The potential transaction manager 104 can compare the predicted value to a threshold as described above. Responsive to determining the predicted value exceeds the threshold, the account updater 134 can insert a flag into the data structure or record of the potential transaction indicating the potential transaction has expired. Based on the flag, the potential transaction manager 104 can complete the transaction and not complete future transactions based on account potential transaction codes generated for the potential transaction or may not complete the transaction and send back a message indicating the account potential transaction code is not valid.

The account updater 134 can determine potential transactions are expired for any reason. In one example, a service provider may assign a time limit or a set duration to a potential transaction. The time limit or set duration may be included in the potential transaction data of the potential transaction. The account updater 134 can determine when the time limit or set duration is over and insert a flag in the data structure of the potential transaction indicating the potential transaction is expired.

In some embodiments, the flags that the account updater 134 inserts into the data structures for the accounts and/or the data structures of the potential transactions may restrict sharing of account potential transaction codes for which the flags were generated. For example, the account updater 134 may store a flag in a data structure for an account indicating a specific account potential transaction code cannot be used. A user accessing the account may attempt to share the account potential transaction code (e.g., share on another social media platform), but the user interface of the platform may not present the option to do so or the potential transaction manager 104 may restrict (e.g., by transmitting a message to the user responsive to a selection to share the account potential transaction code at a user interface) sharing of the account potential transaction code. The potential transaction manager 104 may restrict sharing of the account potential transaction code in this way responsive to identifying the flag in the data structure of the account. In some embodiments, the potential transaction manager 104 may similarly restrict sharing of account potential transaction codes responsive to the data structures of potential transactions associated with the account potential transaction codes storing a flag indicating the potential transactions are expired.

In some embodiments, the potential transaction manager 104 may generate uniform resource locator (URL) links for individual account potential transaction codes. For example, the code generator 132 can generate a URL link containing an account potential transaction code and an account identifier based on which the code generator 132 generated the account potential transaction. The URL link can link to a business's landing page, product page, etc. The potential transaction manager 104 can transmit the URL link to a client device. The user of the client device can view the URL link. The user may share the URL link on another web page, such as a social media page of the user. Subsequent to doing so, the potential transaction manager 104 can receive an indication of a selection of the URL link. Responsive to receiving the indication of the selection of the URL link, the account updater 134 can update the account of the user for which the code generator 132 generated the URL link to indicate the selection of the URL link. The account updater 134 can update the account to record any activity performed on the URL link. For example, if a user clicks on the URL link, click through rate, bounce rate, and other metrics can be recorded (e.g., using a pixel that the potential transaction manager 104 places on the landing page of the URL link). In some embodiments, the account updater 134 can update the account in a similar manner to how the account updater 134 can update the account in response to completing a transaction using a potential transaction code, as described herein.

In some embodiments, the code generator 132 can generate URL links that are specific to events. Events can include potential transactions or other types of events such as activities, sporting events, gatherings, concerts, weddings, parties, conferences, seminars, fundraisers, fairs, meetings, workshops, lectures, concerts, movie premieres, etc. The code generator 132 can generate a URL link for an event for an account responsive to receiving a selection of the event at a user interface accessed by a user through the account on a client device. The code generator 132 can generate the URL link using a random number generator, using an account identifier of the user's account, or using any other type of data or method. The code generator 132 can transmit the generated URL link to the client device. The user accessing the client device can view the URL link and include the URL link in online posts or on documents. In some cases, the user can include the URL link in a QR code on a document.

Individuals can select a URL link (or scan a URL link in cases in which the URL link is embedded in a QR code), to access a landing page that corresponds to the event of the URL link. For example, the user can post the URL link on the user's social media profile. Another individual can view and select the URL link through a computing device to access a landing page of the event for which the URL link was generated.

Accounts can be credited for the selections of URL links generated for the accounts. For example, the potential transaction manager 104 can receive (e.g., through a pixel on the landing page of the URL link) an indication of a selection of a URL link. Responsive to receiving the indication of the selection of the URL link, the account updater 134 can identify the account associated with the URL link. The account updater 134 can update the account of the user for which the code generator 132 generated the URL link to indicate the selection of the URL link. Thus, the user can be credited with sharing info regarding different events in their accounts.

Figure 2:
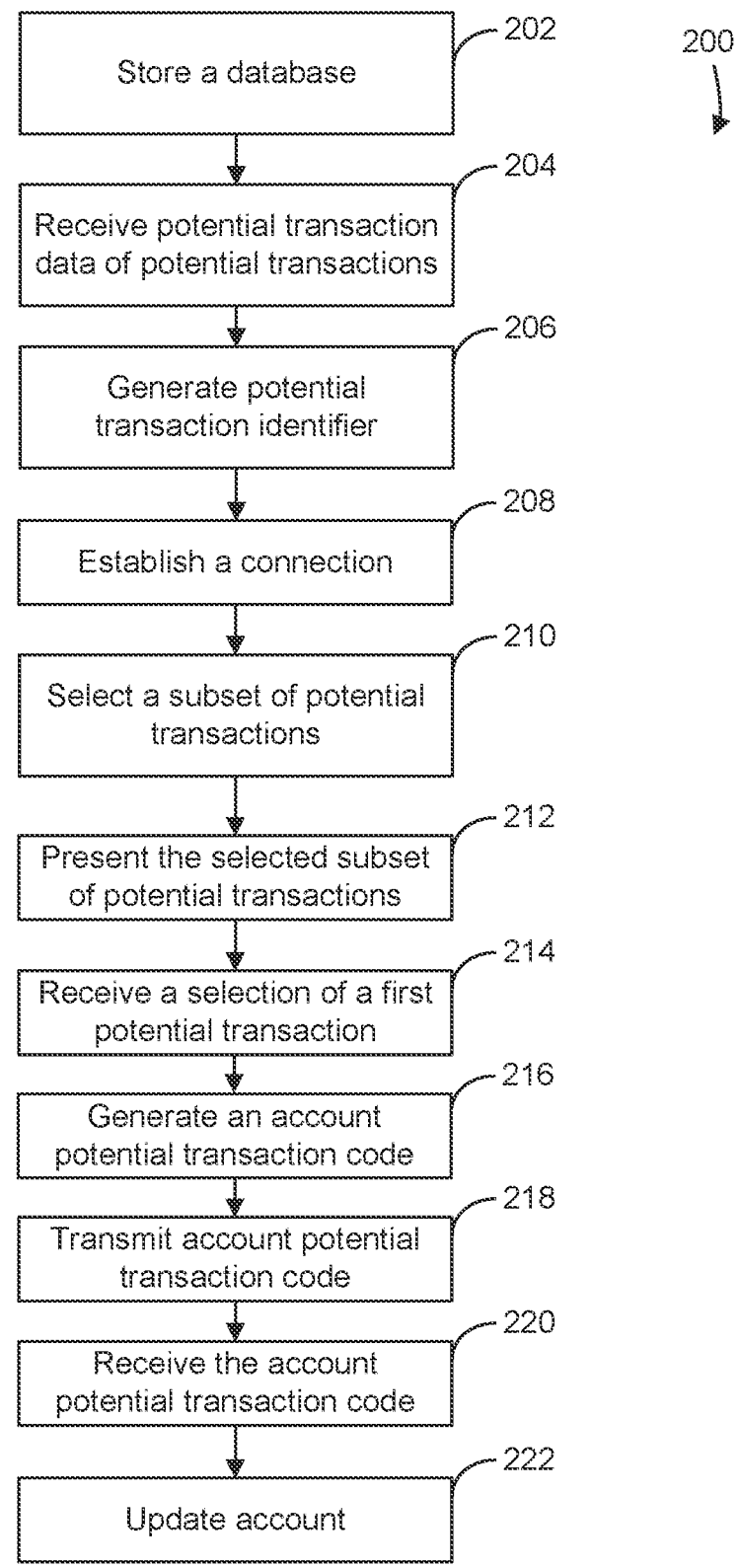
FIG. 2 is an illustration of an example method for targeted potential transaction delivery, in accordance with an implementation.

FIG. 2 is an illustration of an example method 200 for targeted potential transaction delivery, in accordance with an implementation. The method 200 can be performed by a data processing system (e.g., a client device or the potential transaction manager 104, shown and described with reference to FIG. 1, a server system, etc.). The method 200 may include more or fewer operations and the operations may be performed in any order. Performance of the method 200 may enable the data processing system to operate as an intermediary potential transaction management device that facilitates transactions with different service providers. The data processing system may receive potential transaction data of potential transactions provided by different service providers. The data processing system may generate unique account potential transaction codes for users (e.g., influencers or content creators) that elect to share the potential transactions on other platforms. The data processing system may receive the account potential transaction codes in transaction requests and complete the transactions of the requests. The data processing system may attribute the transactions to the users who initially shared the received account potential transaction codes.

In the method 200, at operation 202, the data processing system stores a database. The database can be a centralized or decentralized database (e.g., a blockchain). The database can include records or data structures of accounts (e.g., user accounts). Each record or data structure can include data for a different account. Examples of data that can be included in the records or data structures for the accounts can include account identifiers (e.g., numeric or alphanumeric values) that are unique to the individual user accounts, the names of the account holders, demographic data of the account holders, links to social media web pages of the account holders, a list of active potential transactions that the users of the accounts have selected for sharing, a list of all of the potential transactions that the users of the accounts have selected for sharing, a count of the number of instances in which shared account potential transaction codes generated for the account have been used to perform transactions, etc. In some embodiments, the records or data structures can include transaction data of historical transactions that the accounts performed through the data processing system (e.g., through a platform hosted by the data processing system).

In some embodiments, the database can include records or data structures for individual potential transactions. The records or data structures can include potential transaction data for the respective potential transactions. For example, a data structure for a potential transaction can include a field-value pair for the potential transaction identifier for the potential transaction, a maximum value of the potential transaction, a current value of the potential transaction, a description of the potential transaction (e.g., a description in plain text, an image, a video, encrypted text, etc.), a length or time period of the potential transaction, a list of users who have shared an account potential transaction code for the potential transaction, a list of transactions that were performed via the platform for the potential transaction, etc. The data structure can include any amount of data for the potential transaction.

At operation 204, the data processing system receives potential transaction data. The data processing system can receive the potential transaction data from a computing device associated with or owned by a service provider. The potential transaction data can include a description of a potential transaction (e.g., a promotion for a sale or discount) by the service provider, an identification of the service provider, and/or any other type of potential transaction data. The data processing system can receive the potential transaction via an application executing on the computing device.

At operation 206, the data processing system generates a potential transaction identifier. The data processing system can generate the potential transaction identifier for the potential transaction of the received potential transaction data. In some embodiments, the data processing system can generate the potential transaction identifier by identifying the potential transaction identifier in the potential transaction data for the potential transaction. In some embodiments, the data processing system can generate the potential transaction identifier based on the potential transaction data itself. For example, the data processing system can identify keywords from the potential transaction data and convert, such as by using a mapping in a database, the keywords into a defined number of digits. The converted data can be the potential transaction identifier for the potential transaction.

At operation 208, the data processing system establishes a connection. The data processing system may establish a connection with a client device (or another type of computing device). The data processing system may establish the connection with an application executing on the client device. For example, a user of the client device can connect with the platform hosted by the data processing system through the application executing on the client device. In doing so, the user can log in to an account of the user. The account may have a corresponding data structure in the database stored by the data processing system.

At operation 210, the data processing system selects a subset of potential transactions. The data processing system may select the subset of potential transactions based on preferences of the account of the user. For example, the data processing system may determine types of transactions that the user prefers based on historical transaction data stored in the data structure of the account. The data processing system can store identifiers of the determined types of transactions in the data structure for the account. The data processing system can determine types of transactions of the potential transactions with potential transaction data stored in the database (e.g., based on received types of transactions from service providers and/or based on the data of the potential transactions). The data processing system can store the determined types of transactions of the potential transactions in the data structures for the potential transactions. The data processing system can retrieve the identifiers of the types of transactions stored in the account of the user and compare the retrieved identifiers with the identifiers of the types of transactions for the potential transactions. The data processing system can identify and select any data structures for potential transactions that have at least one matching identifier of a type of transaction with the identifiers of the types of transactions of the user's account. In doing so, the data processing system can select a subset of potential transactions for the user.

At operation 212, the data processing system presents the selected subset of potential transactions. The data processing system can present the selected subset of potential transactions by transmitting potential transaction data (e.g., a description and/or images) of the selected subset of potential transactions to the client device. The client device can receive the potential transaction data and display the potential transaction, such as in a list form with different widgets that individually display the potential transaction data of different potential transactions.

At operation 214, the data processing system receives a selection of a first potential transaction. The user can view the list of potential transactions on the display of the client device. From the list, the data processing system can select the first potential transaction. The client device can transmit the selection to the data processing system, and the data processing system can receive the selection.

At operation 216, the data processing system generates an account potential transaction code. The data processing system can generate an account potential transaction code for the selected first potential transaction. The data processing system can generate the account potential transaction code based on the potential transaction identifier of the first potential transaction and the account identifier of the account the user used to access and select the first potential transaction. For example, the data processing system can retrieve the first potential transaction identifier of the first potential transaction from the data structure for the first potential transaction in the database and the account identifier from the data structure for the account from the database. The data processing system can concatenate the two identifiers together to generate the account potential transaction code for the first potential transaction as selected through the user's account. In some embodiments, the data processing system can store the account potential transaction code in the data structure of the user's account and/or the data structure of the first potential transaction.

At operation 218, the data processing system transmits the account potential transaction code. The data processing system can transmit the account potential transaction code to a second computing device. For example, the user can select an option to share the account potential transaction on a social media website. Responsive to receiving the selection, the data processing system can identify an identifier of a computer hosting the social media website and transmit the account potential transaction code in a message to the computer. In some cases, the data processing system can include text or images input by the user in the message to the computer. The computer can display the contents of the message, including the account potential transaction code on the user's profile on the social media website.

At operation 220, the data processing system receives the account potential transaction code. The data processing system can receive the account potential transaction code in a transaction request to complete a transaction. The transaction request can include transaction data (e.g., an itemized order) for the transaction. The data processing system can receive the account potential transaction code from a third computing device. The data processing system can receive the account potential transaction after a user accessing the third computing device viewed the account potential transaction code on the social media website, for example. The data processing system can transmit a message including transaction data with the account potential transaction code to the computing device associated with the potential transaction to complete the transaction.

At operation 222, the data processing system updates the account of the user that shared the account potential transaction code. The data processing system can update the account to indicate the transaction (e.g., indicate the transaction was completed). The data processing system can update the account by incrementing a counter stored in the data structure for the account by a defined value (e.g., one) or by an amount of the transaction. In this way, the data processing system can attribute credit for the transaction to the user that shared the account potential transaction code.

Figure 3:
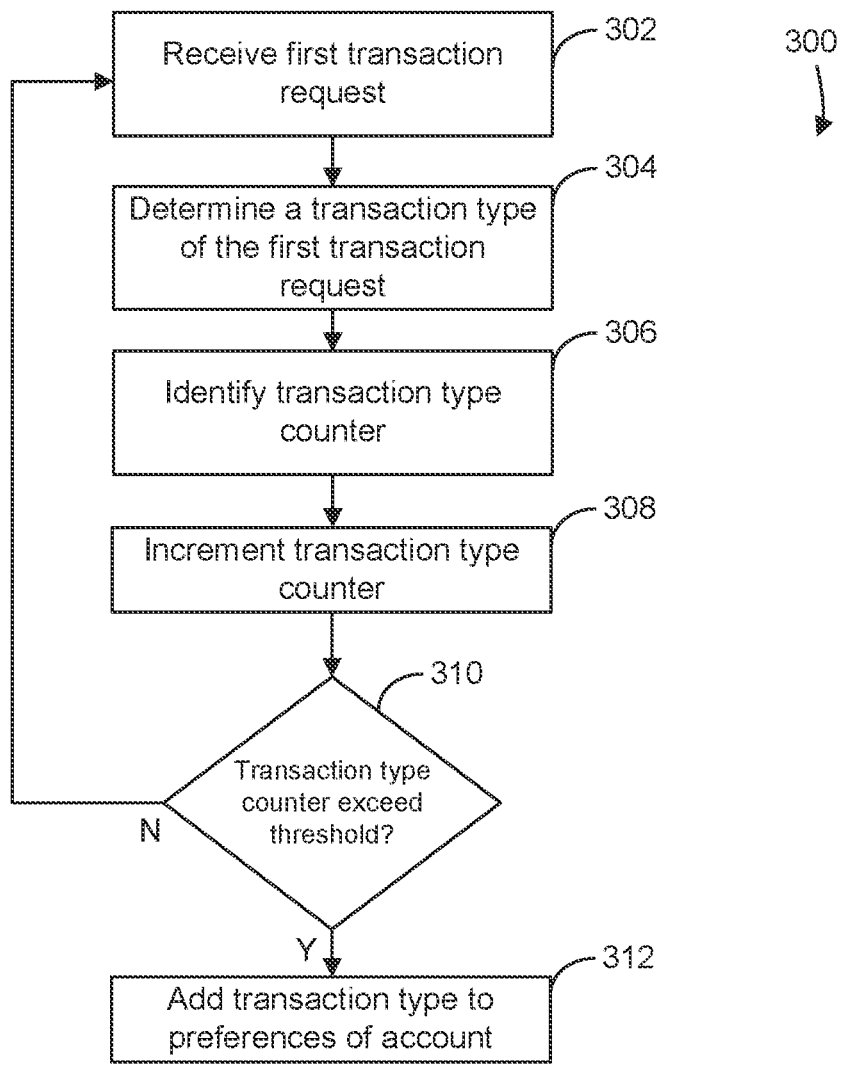
FIG. 3 is an illustration of an example method for automatic preference determination, in accordance with an implementation.

FIG. 3 is an illustration of an example method 300 for automatic preference determination, in accordance with an implementation. The method 300 can be performed by a data processing system (e.g., a client device or the potential transaction manager 104, shown and described with reference to FIG. 1, a server system, etc.). The method 300 may include more or fewer operations and the operations may be performed in any order. Performance of the method 300 may enable the data processing system to provide relevant potential transactions to users without using tracking cookies.

In the method 300, at operation 302, the data processing system receives a first transaction request. The data processing system can receive the first transaction request from a client device or another type of computing device. The data processing system can receive the first transaction request through a platform hosted by the data processing system. The first transaction request can be or include a request to perform a transaction to purchase a product or service. The first transaction request can include an amount for the transaction, a time of the transaction, a list of products or services being purchased, a name of the service provider of the transaction, etc. A user can submit the first transaction request through an account that the user has with the platform hosted by the data processing system.

At operation 304, the data processing system determines a transaction type (e.g., a type of transaction) of the first transaction request. The data processing system can determine the transaction type of the first transaction request based on the transaction data of the first transaction request. For example, the data processing system can identify any of the time, the list of products or services being purchased, and/or the name of the service provider from the transaction request. The data processing system can compare the identified data to mappings in a database that map such data to individual types of transactions. The data processing system can identify mappings that correspond to the identified data from the transaction request and identify the types of transactions of the identified mappings. The data processing system can identify any number of types of transactions for the first transaction request in this way. The identified types of transactions can be the determined transaction types of the first transaction request.

At operation 306, the data processing system identifies a transaction type counter. The transaction type counter can be a counter that indicates a total number of transactions that the account performs for a specific type of transaction. Transaction type counters can be stored in a data structure for the account. The data structure can include transaction type counters for any number of types of transactions. The data processing system can identify the transaction type counter for the first transaction request from the data structure. The data processing system can identify the transaction type responsive to the transaction type counter corresponding to the same transaction type as the first transaction request. In cases in which the first transaction request corresponds to multiple transaction types, the data processing system can identify multiple transaction type counters, a transaction type counter for each transaction type to which the first transaction request corresponds.

At operation 308, the data processing system increments the transaction type counter. The data processing system can increment the transaction type counter by a defined value (e.g., one). The value can be a quantity or a value dollar amount. The data processing system can increment each transaction type counter that the data processing system determines for the first transaction request. In some embodiments, the data processing system can increment the transaction type counter responsive to completion of the transaction of the first transaction request. For example, the data processing system can receive an indication that the transaction of the first transaction settled from a financial institution or receive an indication from the service provider of the first transaction request indicating the transaction was completed. Responsive to receiving such an indication, the data processing system can increment the transaction type counter.

At operation 310, the data processing system determines whether the transaction type counter exceeds a threshold. The threshold may be defined threshold that is stored in memory. In some embodiments, the threshold can be specific to the transaction type of the transaction type counter (e.g., the data processing system may store and use different thresholds for different transaction types). The data processing system can compare the count of the transaction type counter to the threshold. The data processing system can compare each count of each incremented transaction type counter to the threshold (e.g., the same threshold or a threshold specific to the transaction types of the transaction type counters). Responsive to determining the count does not exceed or otherwise satisfy the threshold, the data processing system can return to the operation 302. The data processing system can repeat the operations 302-310 until determining the transaction type counter exceeds the threshold.

Responsive to determining the transaction type counter exceeds the threshold, at operation 312, the data processing system adds the transaction type of the transaction type counter exceeding the threshold to account preferences of the account. The data processing system can do so by adding an identifier of the transaction type to the data structure of the account. The data processing system can add an identifier of each transaction type that corresponds with a transaction type counter exceeding the threshold to the data structure. The identifiers of the transaction types may be preferences of the account.

Figure 4:
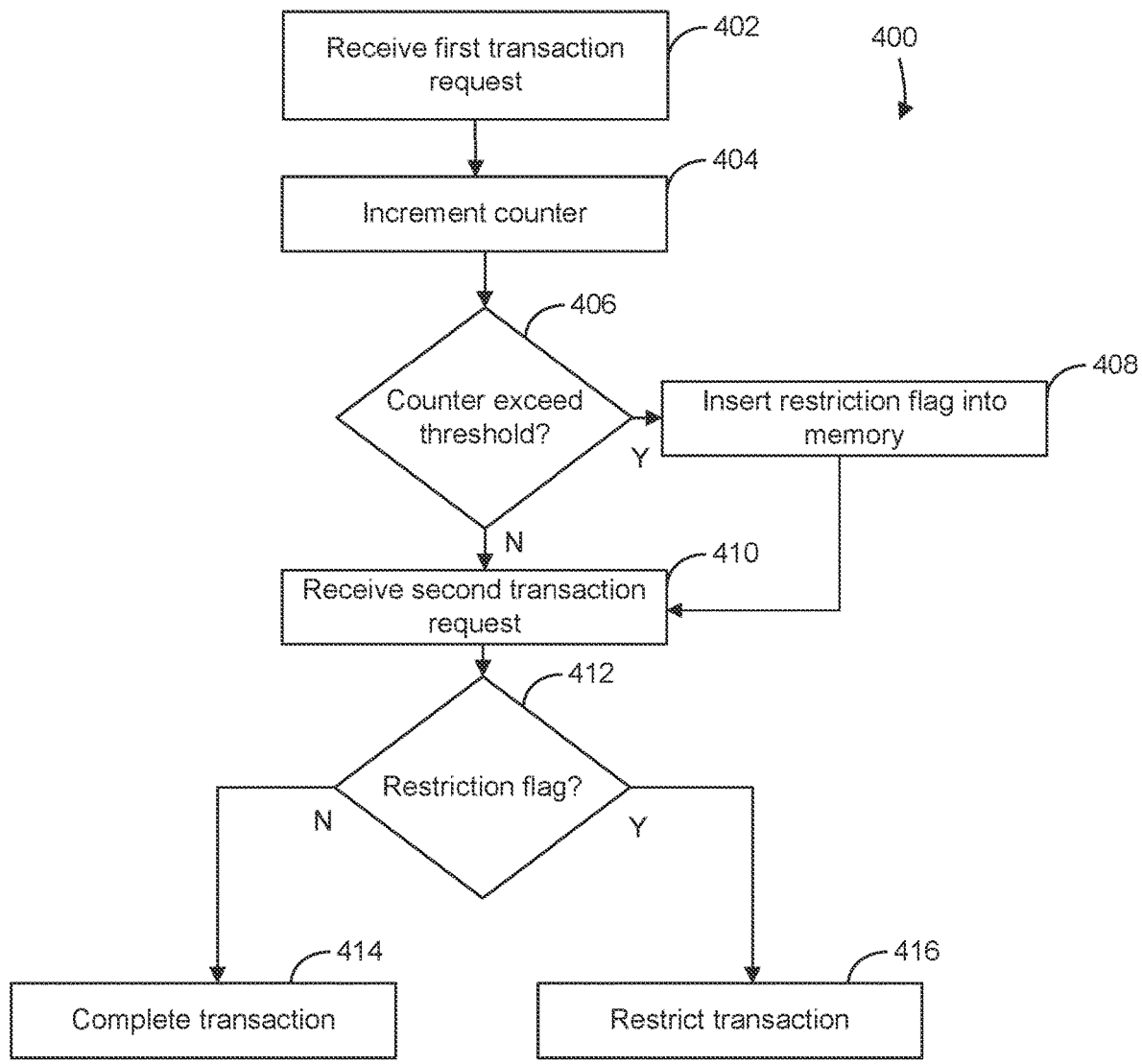
FIG. 4 is an illustration of an example method for automatic potential transaction restriction, in accordance with an implementation.

FIG. 4 is an illustration of an example method 400 for automatic potential transaction restriction, in accordance with an implementation. The method 400 can be performed by a data processing system (e.g., a client device or the potential transaction manager 104, shown and described with reference to FIG. 1, a server system, etc.). The method 400 may include more or fewer operations and the operations may be performed in any order. Performance of the method 400 may enable the data processing system to control which potential transactions can be used to perform transactions through a platform provided by the data processing system.

In the method 400, at operation 402, the data processing system receives a first transaction request. The data processing system can receive the first transaction request from a client device or another type of computing device. The data processing system can receive the first transaction request through a platform hosted by the data processing system. The first transaction request can be or include a request to perform a transaction to purchase a product or service. The first transaction request can include an amount for the transaction, a time of the transaction, a list of products or services being purchased, a name of the service provider of the transaction, etc. The first transaction request can include an account potential transaction code that can be used to complete the transaction. A user can submit the first transaction request through an account that the user has with the platform hosted by the data processing system.

At operation 404, the data processing system increments a counter. The counter can be a counter for the account potential transaction code. The data processing system can retrieve the counter from the account of the user for which the account potential transaction code was generated. The data processing system can retrieve the counter in response to identifying the account potential transaction code from the first transaction request. The data processing system can increment the counter by a defined value (e.g., one) or a value (e.g., a total amount) for the transaction of the first transaction request. The counter can correspond to any type of data, such as a quantity, a price, etc. The defined value can be a set or defined value per transaction.

At operation 406, the data processing system determines whether the counter exceeds a threshold. The threshold can be input by a user creating the potential transaction. The data processing system can compare the count of the counter after the increment of the counter to the threshold. The data processing system can determine whether the count of the counter exceeds the threshold based on the comparison. In one example, the data processing system can use the equation $B/(P_{value}*k)>=P_{max}$, where B is the threshold, $P_{value}$ is a value of the potential transaction per use of the potential transaction, k is a defined value, and $P_{max}$ is a counter that the data processing system increments for each use of the potential transaction. The data processing system can increment $P_{max}$ until the equation is no longer satisfied. Responsive to determining the equation is no longer satisfied, the data processing system can remove the potential transaction from memory or insert a restriction flag that stops the potential transaction from being used.

Responsive to determining the count of the counter exceeds the threshold, at operation 408, the data processing system inserts a restriction flag into memory. The restriction flag can be an indication that the account potential transaction code has expired. The data processing system can insert the restriction flag into the data structure of the account for which the account potential transaction code was generated.

At operation 410, the data processing system receives a second transaction request. The data processing system can receive the second transaction request in the same manner as the first transaction request, but from the same or a different computing device and/or account. The second transaction request can be for a second transaction. The second transaction request can include the account potential transaction code.

At operation 412, the data processing system determines whether there is a restriction flag for the account potential transaction code. The data processing system can do so by querying the account for which the account potential transaction code was generated. The data processing system can determine there is a restriction flag for the account potential transaction code responsive to identifying the restriction flag in the data structure. The data processing system can determine there is not a restriction flag for the account potential transaction code responsive to determining there is not such a restriction flag in the data structure.

Responsive to determining there is not a restriction flag for the account potential transaction code, at operation 414, the data processing system completes the transaction of the second transaction request. The data processing system can do so, for example, by transmitting a message to the service provider (e.g., a computing device of the service provider) of the second transaction request. The data processing system can include an identification of the potential transaction for which the account potential transaction code was generated. The service provider can complete the transaction with the user who submitted the second transaction request, doing so based on the potential transaction of the account potential transaction code. The data processing system can update the account of the user that corresponds with the account potential transaction code to indicate the transaction was completed using the account potential transaction code.

However, responsive to determining there is a restriction flag for the account potential transaction code, at operation 416, the data processing system restricts the transaction. The data processing system can restrict the transaction by transmitting a message to the computing device that submitted the second transaction request indicating the account potential transaction request could not be used. The user accessing the computing device may view the message and select an option to perform the transaction of the second transaction request without the account potential transaction code or select an option to not complete the transaction.

Figure 5:
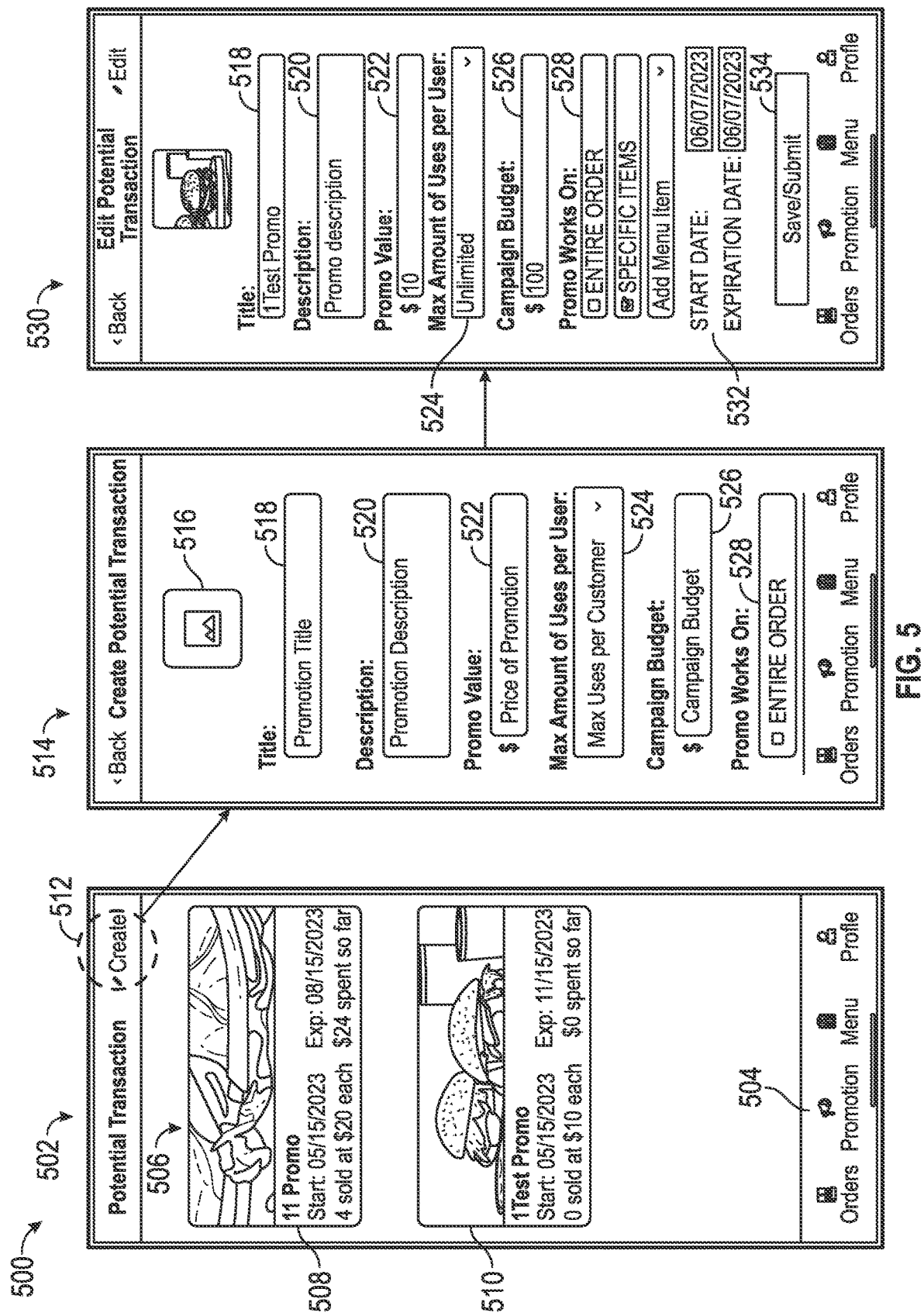
FIG. 5 is an illustration of a sequence of user interfaces for generating a potential transaction, in accordance with an implementation.

FIG. 5 is an illustration of a sequence 500 of user interfaces for generating a potential transaction, in accordance with an implementation. The sequence 500 can include user interfaces that are generated by a data processing system (e.g., a client device or the potential transaction manager 104, shown and described with reference to FIG. 1, a server system, etc.) and transmitted to a computing device (e.g., one of the computing devices 102). The data processing system can generate and transmit a user interface 502 of the sequence 500 responsive to receiving a request from the user interface to access a potential transaction tab 504. The user interface 502 may illustrate potential transactions that a service provider of the computing device has created through a platform hosted by the data processing system.

The user interface 502 can include a list 506 of potential transactions. The service provider of the computing device may have created each of the potential transactions of the list 506. The potential transactions are shown on the user interface in separate widgets 508 and 510. Each widget can show the details of the potential transaction, such as the name of the potential transaction, the start date of the potential transaction, the expiration date of the potential transaction, a number of units sold using the potential transaction, and a total amount spent using the potential transaction. The data processing system can update such information as users use account potential transaction codes of the respective potential transactions to complete transactions with the service provider. A user of the computing device displaying the user interface 502 can select a create option 512 to create a new potential transaction to add to the list 506 of potential transactions.

Responsive to receiving a selection of the create option 512, the data processing system can generate and transmit a user interface 514 to the computing device. The user interface 514 can include a picture field 516, a potential transaction title field 518, a description field 520, an individual potential transaction value field 522, a maximum amount of uses per user field 524, a total potential transaction value field 526, a potential transaction control field 528. The user accessing the computing device displaying the user interface 514 can provide inputs into each of the fields 516-528 to create a potential transaction. The inputs can be or include potential transaction data for the potential transaction.

The picture field 516 can be configured to receive an image (e.g., a JPEG, a BMP, a TIPP, a PDF, etc.), a video, a GIF, etc., for the promotion. The user can insert an image depicting the service provider (e.g., a logo of the service provider or a brick-and-mortar store in which the service provider is located) or one or more items that are subject to the potential transaction. The description field 520 can be configured to receive a text description of the potential transaction. The individual potential transaction value field 522 can indicate an amount to allocate to a user for each use of an account potential transaction code generated for the potential transaction. The maximum amount of uses per user field 524 can be a drop-down menu and indicate a limit that an individual can use the potential transaction for purchases (e.g., a limit to the number of instances in which an account of a user can input an account potential transaction code for the potential transaction). The total potential transaction value field 526 can indicate a total amount allocated to the potential transaction. The total potential transaction value field 526 can indicate a threshold or limit to a value that is incremented by a defined value (e.g., a defined value set at a user interface). The potential transaction control field 528 can include one or more selectable checkboxes and/or a dropdown menu to indicate the items to which the potential transaction apply or that the potential transaction applies to an entire transaction.

The user of the computing device can generate a potential transaction using the user interface 514. For example, the user can input values or otherwise apply input to the fields 516-528. The user can select a button to submit the potential transaction. Upon selection of the button, the computing device can transmit the inputs to the data processing system as potential transaction data. The data processing system can generate a record or data structure for the potential transaction and store the potential transaction data in the record or data structure.

The user of the computing device can update the potential transaction using a user interface 530. The data processing system can generate and transmit the user interface 530 responsive to receiving a request to edit the potential transaction from the computing device. The user interface 530 can include the same fields 516-528 as in the user interface 514 but with the values and/or selections the user had input at the user interface 514. The user interface 530 is also shown to include a time period form 532 and a save/submit button 534. The time period form 532 and the save/submit button 534 may have been present and selected at the user interface 514. The time period form 532 can indicate a start day and/or time of the potential transaction and an expiration day and/or time of the potential transaction. The save/submit button 534 may enable a user to submit the potential transaction to the data processing system or submit any updates for the potential transaction. The user can change or add new values to any of the fields 516-528 and 532. The user can select the save/submit button 534 to transmit the potential transaction data including the updated values to the data processing system. In some embodiments, the user interface 530 can include an option to generate and/or share a URL link for the potential transaction such that the data processing system generates a URL link instead of or in addition to a potential transaction code responsive to receiving a selection of a share button of the URL link.

The data processing system can update the data structure for the potential transaction based on the updated potential transaction data. For example, the data processing system can receive the updated potential transaction data with the updated values from the computing device. The data processing system can compare the values or selections of the updated potential transaction data with the potential transaction data of the data structure. The data processing system can identify any differences based on the comparison and adjust the potential transaction data in the data structure to match the values of the updated potential transaction data.

Figure 6:
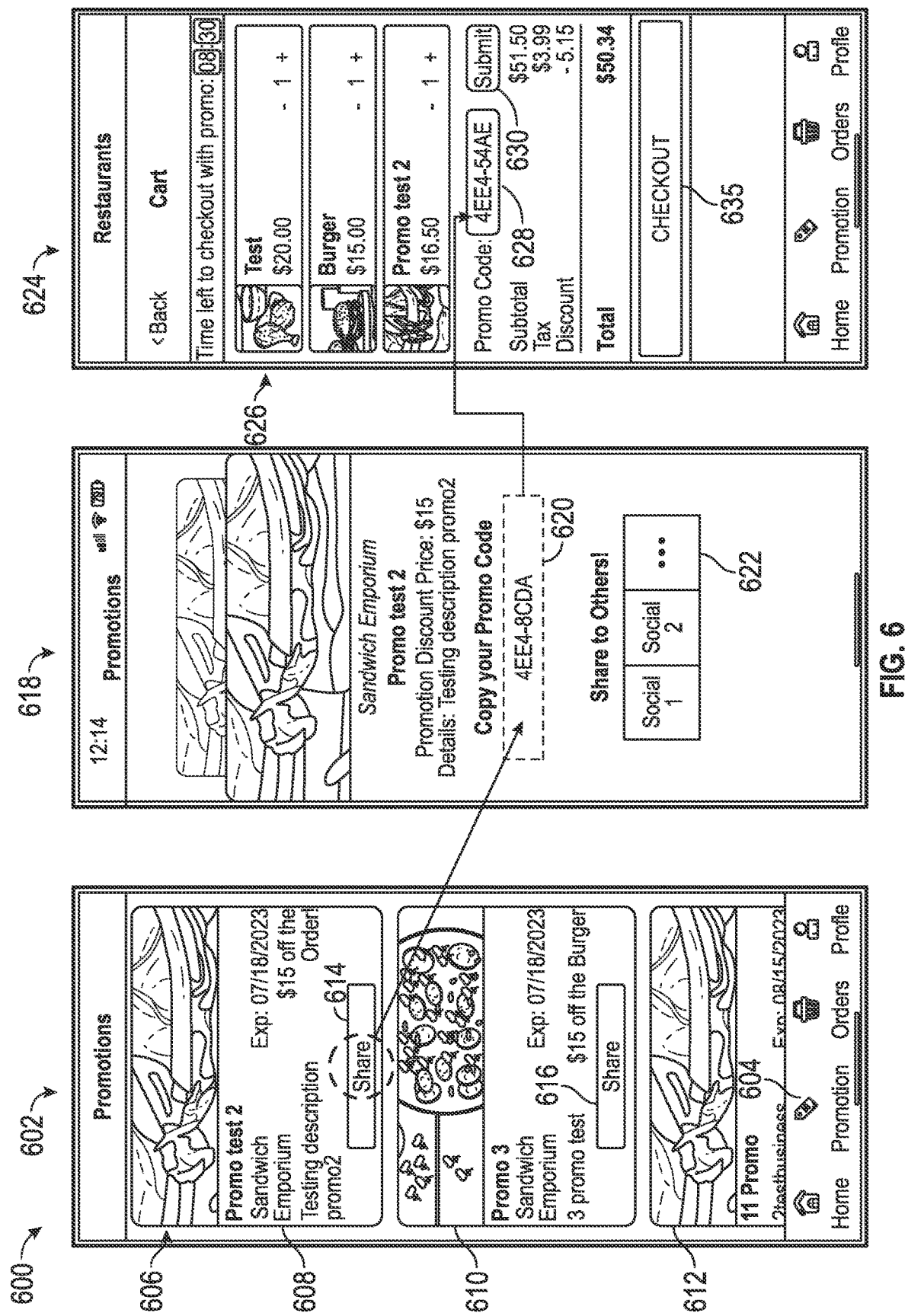
FIG. 6 is an illustration of a sequence of user interfaces for selecting a potential transaction, in accordance with an implementation.

FIG. 6 is an illustration of a sequence 600 of user interfaces for selecting a potential transaction, in accordance with an implementation. The sequence 600 can include user interfaces that are generated by a data processing system (e.g., a client device or the potential transaction manager 104, shown and described with reference to FIG. 1, a server system, etc.) and transmitted to a client device (e.g., one of the client devices 106). The data processing system can generate and transmit a user interface 602 of the sequence 600 responsive to receiving a request from the user interface to access a potential transaction tab 604. The user interface 602 may illustrate potential transactions that a user (e.g., an influencer or a content creator) may select to share on social media platforms.

The user interface 602 can include a list 606 of potential transactions. The data processing system may have created the list 606 of potential transactions based on previous transactions that the account of the client device is using to access the platform provided by the data processing system, as described herein, and in some cases. The potential transactions of the list 606 are shown on the user interface in separate widgets 608, 608, and 610. Each widget can show the details of the potential transaction, such as the name of the potential transaction, the start date of the potential transaction, the expiration date of the potential transaction, a discount of the potential transaction, and a description of the potential transaction. The widgets 608-612 can respectively include share buttons (e.g., share buttons 614 and 616). A user of the client device can select one of the share buttons to select and/or share the potential transaction on a social media platform.

For example, the user accessing the client device can select the share button 614 to share the potential transaction of the widget 608. Responsive to selecting the share button 614, the client device can transmit a message to the data processing system indicating the selection, including an identification of the selected potential transaction. The data processing system can receive the message from the client device. In response, the data processing system can generate and transmit a user interface 618 to the client device that enables the user to share the potential transaction on social media platforms. In this way, the share button 614 can allow users to receive personalized potential transaction codes to include on different social media sites. In some cases, instead of a potential transaction code, selecting the share button 614 can cause the data processing system to generate and transmit a URL link for the user and the potential transaction or an event to the client device.

The user interface 618 can include an account potential transaction code 620 (or a URL link) and a list 622 of social media platforms. The data processing system can generate the account potential transaction code 620 based on a potential account identifier of the selected potential transaction and an account identifier of the account of the user that selected the potential transaction as described herein. The list 622 of potential transactions can include icons or text identifiers of different social media platforms (e.g., websites, email, text messages, etc.). The user accessing the client device can select one or more of the social media platforms from the list 622. Upon selecting one of the social media platforms, the data processing system can transmit a message to a computer hosting the selected social media platform indicating the account potential transaction code 620 in some cases with an identification of the user or account that selected the social media platform. The computer can post a message on a profile of the social media platform that includes the account potential transaction code 620. Users of the social media platform may view the account potential transaction code and use the account potential transaction to perform transactions through the platform hosted by the data processing system.

For example, a user may see the account potential transaction code 620 on the selected social media platform. Upon doing so, using a client device (e.g., the client device 107), the user may access the user's account on the platform hosted by the data processing system. The user can select different options to purchase items from the service provider of the potential transaction for which the account potential transaction code was generated. The data processing system may generate and transmit a user interface 624 to the client device. The user interface 624 may illustrate items that the user has selected for purchase from the service provider with options to adjust the selections and submit a transaction request to purchase the selected items in a transaction.

The user interface 624 can include a list 626 of products (e.g., items), an account potential transaction code field 628, an account potential transaction code button 630, and a submit button 632. The user accessing the user interface 624 can adjust the items of the list 626 by increasing or decreasing the number of items of the transaction. The user can input the account potential transaction code 620 into the account potential transaction code field 628. The user can select the account potential transaction code button 630 to submit the account potential transaction code 620. In doing so, the user can input a potential transaction code of another user or use their own potential transaction code (e.g., a first user can use their own code after a second user made a purchase using the first user's potential transaction code). The data processing system can receive the submission of the account potential transaction code and query the data structure for the potential transaction code that corresponds to the account potential transaction code. The data processing system can identify potential transaction data of the potential transaction to determine how to adjust (e.g., how to discount) the amount of the transaction, based on the individual items of the transaction and/or based on the transaction with the service provider as a whole. In some embodiments, the user can submit multiple account potential transaction codes and the data processing system can update the amount for the transaction accordingly. The data processing system can update the user interface 624 to indicate the updated total amount for the transaction and an amount by which the data processing system decreased the total amount for the transaction. The user can select the submit button 632 to cause the data processing system to complete the transaction.

Figure 7:
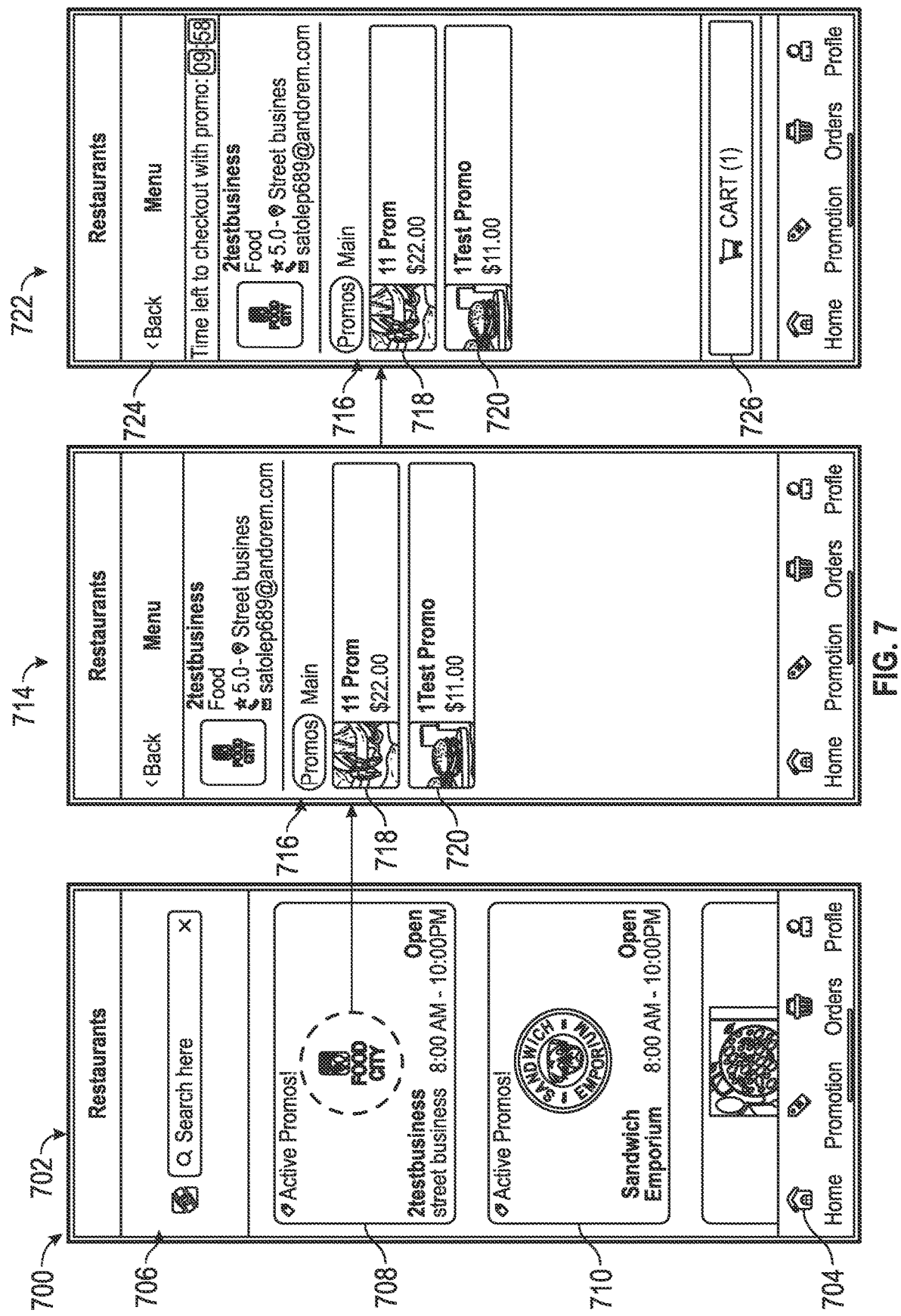
FIG. 7 is an illustration of a sequence of user interfaces for accessing potential transactions, in accordance with an implementation.

FIG. 7 is an illustration of a sequence 700 of user interfaces for accessing potential transactions, in accordance with an implementation. The sequence 700 can include user interfaces that are generated by a data processing system (e.g., a client device or the potential transaction manager 104, shown and described with reference to FIG. 1, a server system, etc.) and transmitted to a client device (e.g., the client device 107). The data processing system can generate and transmit a user interface 702 of the sequence 700 responsive to receiving a request from the user interface to access a home tab 704. The user interface 702 may illustrate service providers that have uploaded potential transaction data for potential transactions to the platform hosted by the data processing system.

The user interface 702 can include a list 706 of service providers. The data processing system may create the list 706 of service providers to include different service providers that have uploaded potential transaction data for potential transactions to the data processing system. The service providers of the list 706 are shown on the user interface 702 in separate widgets 708, 710, and 712. Each widget 708, 710, and 712 can show an identification of a different service provider, details regarding the service provider (e.g., operating hours, a current open status, a business type, etc.), and an indication of whether the service provider has any potential transactions that are currently active. A user of the client device can select one of the widgets 708, 710, and 712 to view potential transactions of the service provider of the selected widget.

For example, the user accessing the client device can select the widget 708. Responsive to selecting the widget 708, the client device can transmit a message to the data processing system indicating the selection, including an identification of the service provider of the selected widget 708. The data processing system can receive the message from the client device. In response, the data processing system can generate and transmit a user interface 714 to the client device that enables the user to view active potential transactions of the service provider.

The user interface 714 can include a list 716 of potential transactions. The list 716 of potential transactions can include potential transactions that are currently active for the service provider of the selected widget 708. The data processing system may create the list 716 of potential transactions by querying a database for potential transactions that correspond to (e.g., have a stored association with an identification of) the service provider. In some embodiments, the data processing system can store a record or data structure for individual service providers that include potential transaction data of the potential transactions of the service providers. In such embodiments, the data processing system can query memory to identify the record of the service provider. The data processing system can retrieve the potential transaction data of the potential transaction of the service provider. The data processing system can create the list 716 of potential transactions with the potential transaction data. In one example, as illustrated in the user interface 714, the list 716 may include widgets 718 and 720 for two different potential transactions of the service provider. Each widget 718 and 720 can show an identification of a different potential transaction and details regarding the potential transaction (e.g., the item or product that is subject to the potential transaction, the value of the potential transaction, etc.).

The data processing system may set a time limit on the amount of time a user may view the potential transactions on the user interface 714. For example, while the user views the list 716 of potential transactions, the data processing system may maintain and increment a timer. After a defined amount of time, the data processing system may update the user interface 714 to the user interface 722. In doing so, the data processing system may display a time left ribbon 724. The time left ribbon 724 may display the total time the user has left to select a promotion from the list 716 of promotions. The data processing system may decrement a counter indicating the total time left over time until the counter reaches zero. If the user does not select a promotion to use for a transaction before the counter reaches zero, the data processing system may update the user interface to indicate for the user to start over. However, if the user selects a potential transaction from the list 716 and selects a submit button 726 on the user interface 722, the data processing system may generate and transmit a transaction performance user interface to the client device to complete the transaction based on the selected potential transaction.

At least one aspect of a technical solution to the problems described herein is directed to a system. The system may include a network interface; and one or more processors coupled with memory, the memory storing instructions that, upon execution by the one or more processors, cause the one or more processors to store, in the memory, a database comprising a plurality of accounts, each account corresponding to a different account identifier and a value and comprising historical transaction data of transactions performed through the account; receive, via the network interface from each of a plurality of computing devices executing a first application, potential transaction data corresponding to a potential transaction associated with the computing device; generate a potential transaction identifier for each of the potential transactions; establish, via the network interface, a connection with a client device through a second application executing on the client device, the second application corresponding to a first account of the plurality of accounts and a first account identifier; select a subset of the potential transactions based on first historical transaction data of the first account satisfying a selection policy with each of the subset of potential transactions; present, via the connection through the second application on the client device, the selected subset of the potential transactions on a user interface at the client device; receive, from the client device through the connection, a selection of a first potential transaction from the subset of the potential transactions; in response to the selection, generate an account potential transaction code based on the first account identifier of the first user account and a first potential transaction identifier of the first potential transaction; transmit the account potential transaction code to a second computing device; subsequent to transmitting the account potential transaction code to the second computing device, receive a transaction request for a transaction, the transaction request comprising the account potential transaction code; and responsive to receiving the transaction request and based on the transaction request comprising the account potential transaction code, update the first user account to indicate the transaction.

In some embodiments, the execution of the instructions causes the one or more processors to generate the account potential transaction code by concatenating at least a first portion of the first account identifier with at least a second portion of the first potential transaction identifier. In some embodiments, the execution of the instructions further causes the one or more processors to identify a second account that transmitted the transaction request for the transaction; and insert a flag indicating validation of the second account responsive to completing the transaction.

In some embodiments, the execution of the instructions further causes the one or more processors to assign an account potential transaction value to the account potential transaction code; store a counter corresponding to the account potential transaction code; receive a second transaction request for a second transaction, the transaction request comprising the account potential transaction code; and responsive to determining the second transaction would cause the counter to exceed the account potential transaction value, insert a flag into the first account indicating the first potential transaction code is expired.

In some embodiments, the execution of the instructions further causes the one or more processors to generate a plurality of account potential transaction codes based on each of a plurality of account identifiers of a plurality of accounts and the first potential transaction identifier; assign a potential transaction value to the first potential transaction identifier; store a counter corresponding to the potential transaction value; increment the counter by a transaction value of the transaction; determine that incrementing the counter causes a count of the counter to exceed a threshold; and insert a flag into memory indicating the potential transaction value is stale. In some embodiments, the execution of the instructions further causes the one or more processors to receive a second transaction request for a second transaction, the transaction request comprising the account potential transaction code; and responsive to identifying the flag in memory, generate an indication that the account potential transaction code could not be used to perform the second transaction.

In some embodiments, the flag restricts sharing of any account potential transaction codes generated based on the first potential transaction identifier. In some embodiments, the execution of the instructions further causes the one or more processors to generate a uniform resource locator (URL) link for the account potential transaction code, the URL link comprising each of the account potential transaction code and the first account identifier; transmit the URL link to the client device; subsequent to transmitting the account potential transaction code to the client device, receive an indication of a selection of the URL link; and responsive to receiving the indication of the selection of the URL link, update the first user account to indicate the selection of the URL link.

In some embodiments, the execution of the instructions further causes the one or more processors to responsive to receiving the transaction request, identify an identifier of a first computing device associated with the first potential transaction; and transmit data of the transaction request to the first computing device to complete the transaction. In some embodiments, the execution of the instructions further causes the one or more processors to select the subset of the potential transactions by determining a type of potential transaction for each of the potential transactions; determining one or more account preferences for each of the plurality of accounts; and selecting the subset of potential transactions based on each potential transaction of the subset having a type of potential transaction that matches first one or more account preferences of the first user account. In some embodiments, the execution of the instructions further causes the one or more processors to determine the type of potential transaction for each of the potential transactions based on a stored transaction type that is assigned to the computing device that transmitted the potential transaction data for the potential transaction to the one or more processors.

In some embodiments, the execution of the instructions further causes the one or more processors to determine the one or more account preferences for each of the plurality of accounts based on historical transaction data of transactions performed through the account. In some embodiments, the execution of the instructions further causes the one or more processors to determine the one or more account preferences for the first user account by maintaining a transaction type counter for each of a plurality of types of potential transactions for the first user account; for each transaction type counter for the first user account, increment the transaction type counter for each transaction that the first user account performs that corresponds to the type of potential transaction of the transaction type counter; and responsive to a transaction type counter having a count exceeding a threshold, determine a type of potential transaction that corresponds to the transaction type counter is an account preference for the first user account.

In some embodiments, the execution of the instructions further causes the one or more processors to determine the one or more account preferences for the first user account by maintaining a transaction type counter for each of a plurality of types of potential transactions for the first user account; for each transaction type counter for the first user account, increment the transaction type counter for each transaction that the first user account performs that corresponds to the type of potential transaction of the transaction type counter; and responsive to determining counts of a plurality of transaction type counters for the first user account satisfy a condition, determine types of potential transactions that correspond to the plurality of types of potential transaction are account preferences for the first user account. In some embodiments, the execution of the instructions further causes the one or more processors to present the selected subset of potential transactions presenting the potential transaction data of each of the subset of potential transactions in separate widgets each corresponding with a different potential transaction of the subset of potential transactions. In some embodiments, the execution of the instructions further causes the one or more processors to store, in a data structure for the first user account, a list of potential transactions for which an account potential transaction code has been generated for the first user account.

Another aspect of a technical solution to the problems described herein is directed to a method. The method may include storing, by one or more processors in memory, a database comprising a plurality of accounts, each account corresponding to a different account identifier and a value and comprising historical transaction data of transactions performed through the account; receiving, by the one or more processors and from each of a plurality of computing devices executing a first application, potential transaction data corresponding to a potential transaction associated with the computing device; generating, by the one or more processors, a potential transaction identifier for each of the potential transactions; establishing, by the one or more processors, a connection with a client device through a second application executing on the client device, the second application corresponding to a first account of the plurality of accounts and a first account identifier; selecting, by the one or more processors, a subset of the potential transactions based on first historical transaction data of the first account satisfying a selection policy with each of the subset of potential transactions; presenting, by the one or more processors via the connection through the second application on the client device, the selected subset of the potential transactions on a user interface at the client device; receiving, by the one or more processors from the client device through the connection, a selection of a first potential transaction from the subset of the potential transactions; in response to the selection, generating, by the one or more processors, an account potential transaction code based on the first account identifier of the first user account and a first potential transaction identifier of the first potential transaction; transmitting, by the one or more processors, the account potential transaction code to a second computing device; subsequent to transmitting the account potential transaction code to the second computing device, receiving, by the one or more processors, a transaction request for a transaction, the transaction request comprising the account potential transaction code; and responsive to receiving the transaction request and based on the transaction request comprising the account potential transaction code, updating, by the one or more processors, the first user account to indicate the transaction.

In some embodiments, generating the account potential transaction code comprises concatenating, by the one or more processors, at least a first portion of the first account identifier with at least a second portion of the first potential transaction identifier.

At least one aspect of a technical solution to the problems described herein is directed to a non-transitory computer-readable media comprising computer-executable instructions embodied thereon that, when executed by a processor, cause the processor to perform a process comprising storing, in memory, a database comprising a plurality of accounts, each account corresponding to a different account identifier and a value and comprising historical transaction data of transactions performed through the account; receiving, from each of a plurality of computing devices executing a first application, potential transaction data corresponding to a potential transaction associated with the computing device; generating a potential transaction identifier for each of the potential transactions; establishing a connection with a client device through a second application executing on the client device, the second application corresponding to a first account of the plurality of accounts and a first account identifier; selecting a subset of the potential transactions based on first historical transaction data of the first account satisfying a selection policy with each of the subset of potential transactions; presenting, via the connection through the second application on the client device, the selected subset of the potential transactions on a user interface at the client device; receiving, from the client device through the connection, a selection of a first potential transaction from the subset of the potential transactions; in response to the selection, generating an account potential transaction code based on the first account identifier of the first user account and a first potential transaction identifier of the first potential transaction; transmitting the account potential transaction code to a second computing device; subsequent to transmitting the account potential transaction code to the second computing device, receiving a transaction request for a transaction, the transaction request comprising the account potential transaction code; and responsive to receiving the transaction request and based on the transaction request comprising the account potential transaction code, updating the first user account to indicate the transaction.

In some embodiments, generating the account potential transaction code comprises concatenating at least a first portion of the first account identifier with at least a second portion of the first potential transaction identifier.

Computing Environment

Having discussed specific embodiments of the present solution, it may be helpful to describe aspects of the operating environment as well as associated system components (e.g., hardware elements) in connection with the methods and systems described herein.

Figure 8A:
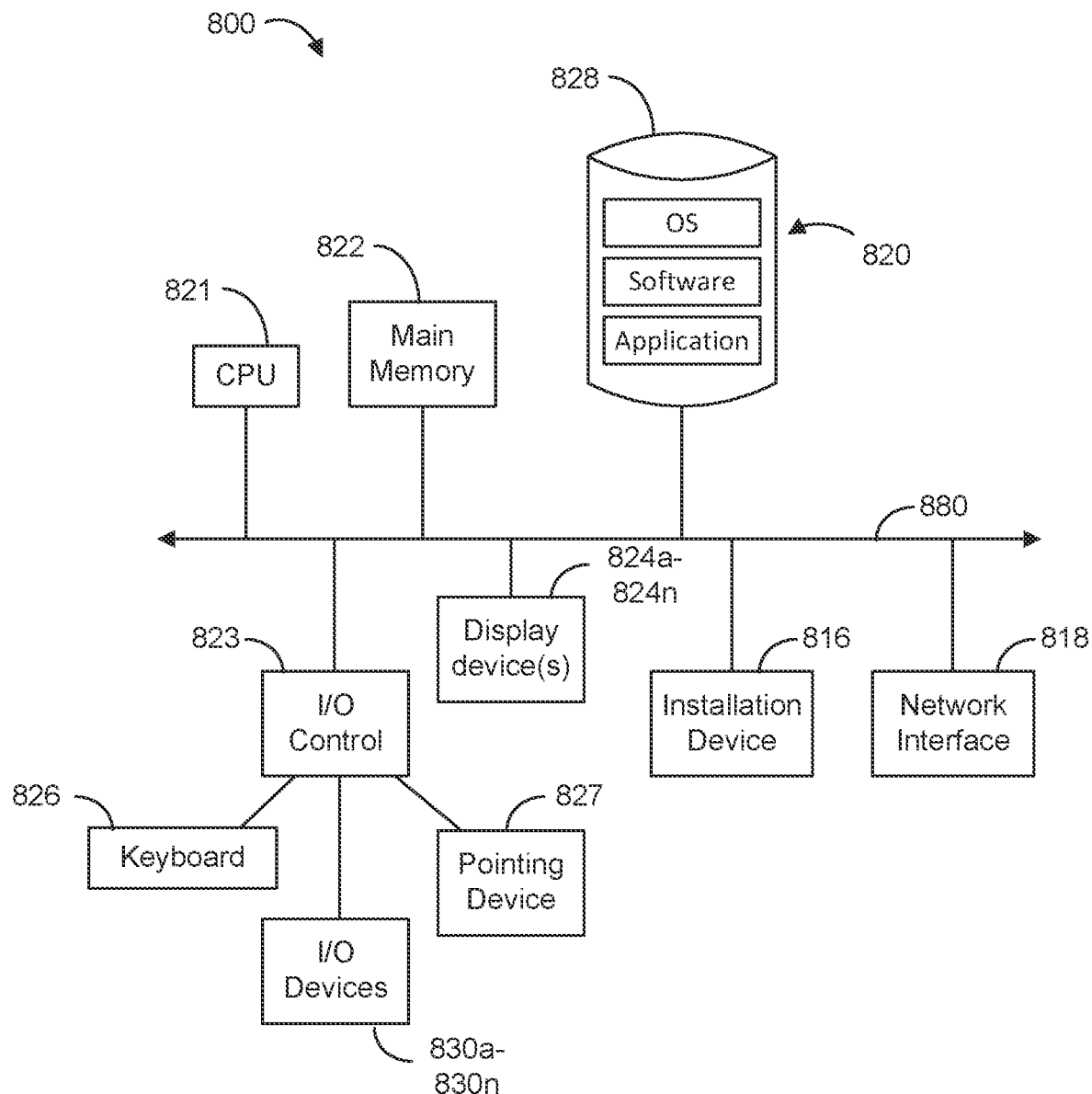
FIGS. 8A and 8B are block diagrams depicting embodiments of computing devices useful in connection with the methods and systems described herein.
Figure 8B:
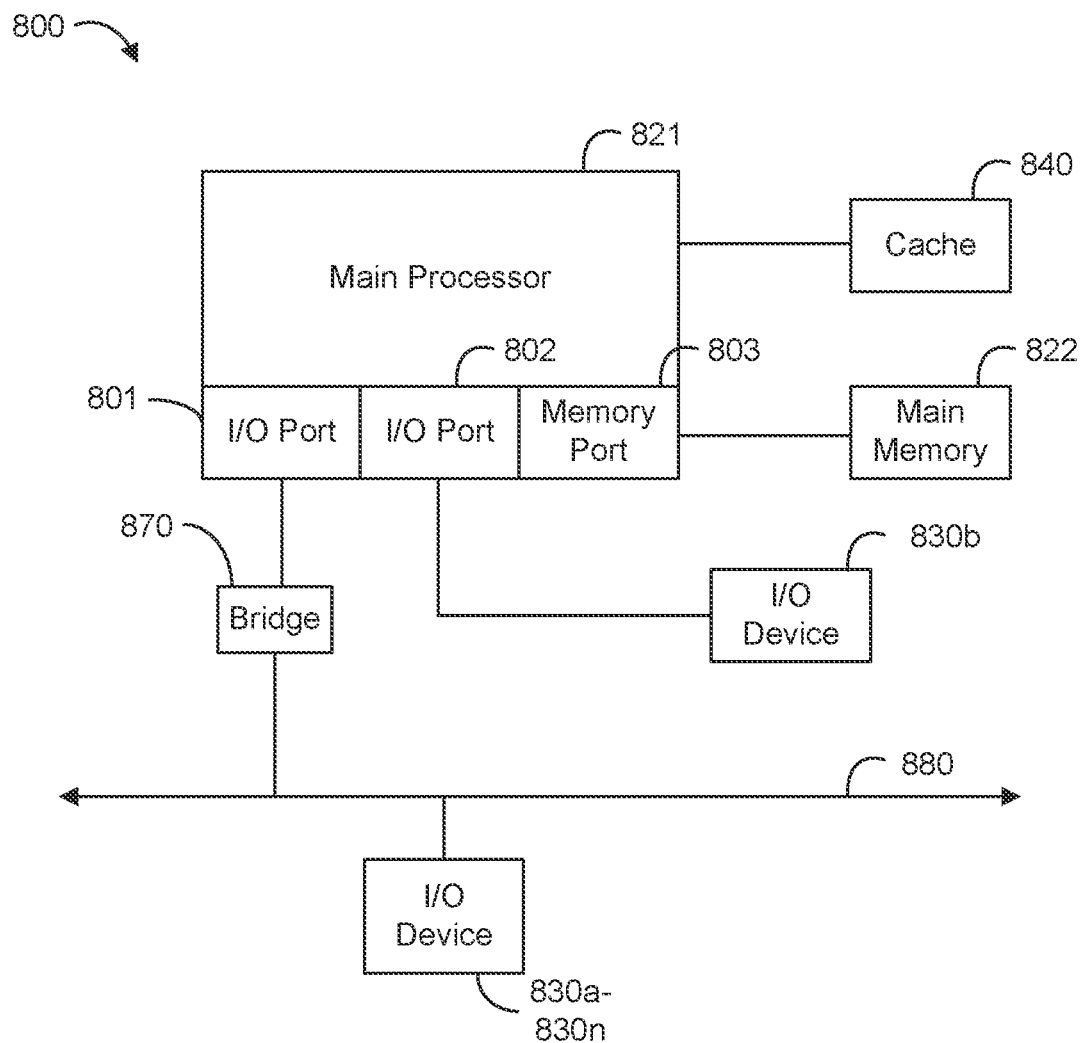

The systems discussed herein may be deployed as and/or executed on any type and form of computing device, such as a computer, network device or appliance capable of communicating on any type and form of network and performing the operations described herein. FIGS. 8A and 8B depict block diagrams of a computing device 800 useful for practicing an embodiment of the systems and methods described herein. As shown in FIGS. 8A and 8B, each computing device 800 includes a central processing unit 821, and a main memory unit 822. As shown in FIG. 8A, a computing device 800 may include a storage device 828, an installation device 816, a network interface 818, an I/O controller 823, display devices 824a-824n, a keyboard 826 and a pointing device 827, such as a mouse. The storage device 828 may include, without limitation, an operating system and/or software. As shown in FIG. 8B, each computing device 800 may also include additional optional elements, such as a memory port 803, a bridge 870, one or more input/output devices 830a-830n (generally referred to using reference numeral 830), and a cache memory 840 in communication with the central processing unit 821.

The central processing unit 821 is any logic circuitry that responds to and processes instructions fetched from the main memory unit 822. In many embodiments, the central processing unit 821 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 800 may be based on any of these processors, or any other processor capable of operating as described herein.

The main memory unit 822 may be one or more memory chips capable of storing data and allowing any storage location to be directly accessed by the central processing unit 821, such as any type or variant of Static random access memory (SRAM), Dynamic random access memory (DRAM), Ferroelectric RAM (FRAM), NAND Flash, NOR Flash and Solid State Drives (SSD). The main memory unit 822 may be based on any of the above described memory chips, or any other available memory chips capable of operating as described herein. In the embodiment shown in FIG. 8A, the central processing unit 821 communicates with main memory unit 822 via a system bus 880 (described in more detail below). FIG. 8B depicts an embodiment of a computing device 800 in which the processor communicates directly with the main memory unit 822 via a memory port 803. For example, in FIG. 8B the main memory unit 822 may be DRDRAM.

FIG. 8B depicts an embodiment in which the central processing unit 821 communicates directly with cache memory 840 via a secondary bus, sometimes referred to as a backside bus. In other embodiments, the central processing unit 821 communicates with cache memory 840 using the system bus 880. Cache memory 840 typically has a faster response time than main memory unit 822 and is provided by, for example, SRAM, BSRAM, or EDRAM. In the embodiment shown in FIG. 8B, the central processing unit 821 communicates with various I/O devices 830 via a local system bus 880. Various buses may be used to connect the central processing unit 821 to any of the I/O devices 830, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 824, the central processing unit 821 may use an Advanced Graphics Port (AGP) to communicate with the display 824. FIG. 8B depicts an embodiment of a computer 800 in which the central processing unit 821 may communicate directly with I/O device 830b, for example via HYPERTRANSPORT, RAPIDIO, or INFINIBAND communications technology. FIG. 8B also depicts an embodiment in which local busses and direct communication are mixed: the central processing unit 821 communicates with I/O device 830a using a local interconnect bus while communicating with I/O device 830b directly.

A wide variety of I/O devices 830a-830n may be present in the computing device 800. Input devices include keyboards, mice, trackpads, trackballs, microphones, dials, touch pads, touch screens, drawing tablets, Internet-of-Things devices, cameras, scanners (e.g., a QR code scanner), etc. Output devices include video displays, speakers, inkjet printers, laser printers, projectors, dye-sublimation printers, cameras, scanners (e.g., a QR code scanner), Internet-of-Things devices, etc. The I/O devices may be controlled by an I/O controller 823 as shown in FIG. 8A. The I/O controller may control one or more I/O devices such as a keyboard 826 and a pointing device 827, e.g., a mouse or optical pen. Furthermore, an I/O device may also provide storage and/or an installation device 816 for the computing device 800. In still other embodiments, the computing device 800 may provide USB connections (not shown) to receive handheld USB storage devices such as the USB Flash Drive line of devices manufactured by Twintech Industry, Inc., of Los Alamitos, California.

Referring again to FIG. 8A, the computing device 800 may support any suitable installation device 816, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 800 may further include a storage device, such as one or more hard disk drives or redundant arrays of independent disks, for storing an operating system and other related software, and for storing application software programs such as any program or software 820 for implementing (e.g., configured and/or designed for) the systems and methods described herein. Optionally, any of the installation devices 816 could also be used as the storage device. Additionally, the operating system and the software can be run from a bootable medium.

Furthermore, the computing device 800 may include a network interface 818 to interface to the network 203 through a variety of connections including, but not limited to, standard telephone lines, LAN or WAN links (e.g., 802.4, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.4, IEEE 802.4a, IEEE 802.4b, IEEE 802.4g, IEEE 802.4n, IEEE 802.4ac, IEEE 802.4ad, CDMA, GSM, WiMax and direct asynchronous connections). In one embodiment, the computing device 800 communicates with other computing devices 800' via any type and/or form of gateway or tunneling protocol such as Secure Socket Layer (SSL) or Transport Layer Security (TLS). The network interface 818 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

In some implementations, the computing device 800 may include or be connected to one or more display devices 824a-824n. As such, any of the I/O devices 830a-830n and/or the I/O controller 823 may include any type and/or form of suitable hardware, software, or combination of hardware and software to support, enable or provide for the connection and use of the display device(s) 824a-824n by the computing device 800. For example, the computing device 800 may include any type and/or form of video adapter, video card, driver, and/or library to interface, communicate, connect or otherwise use the display device(s) 824a-824n. In one embodiment, a video adapter may include multiple connectors to interface to the display device(s) 824a-824n. In other embodiments, the computing device 800 may include multiple video adapters, with each video adapter connected to the display device(s) 824a-824n. In some implementations, any portion of the operating system of the computing device 800 may be configured for using multiple displays 824a-824n. One ordinarily skilled in the art will recognize and appreciate the various ways and embodiments that a computing device 800 may be configured to have one or more display devices 824a-824n.

In further embodiments, an I/O device 830 may be a bridge between the system bus 880 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 800 of the sort depicted in FIGS. 8A and 8B may operate under the control of an operating system, which control scheduling of tasks and access to system resources. The computing device 800 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 800 can be any workstation, telephone, desktop computer, laptop or notebook computer, server, handheld computer, smartwatches, Internet-of-Things devices, mobile telephone or other portable telecommunications device, media playing device, a gaming system, mobile computing device, or any other type and/or form of computing, telecommunications or media device that is capable of communication. The computer system 800 has sufficient processor power and memory capacity to perform the operations described herein.

In some implementations, the computing device 800 may have different processors, operating systems, and input devices consistent with the device. For example, in one embodiment, the computing device 800 is a smart phone, mobile device, tablet or personal digital assistant. In still other embodiments, the computing device 800 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 800 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Any references to ranges or values can be references to approximations of the same ranges or values. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system, comprising:
a network interface; and
one or more processors coupled with memory, the memory storing instructions that, upon execution by the one or more processors, cause the one or more processors to:
store, in the memory, a database comprising a plurality of accounts, each account corresponding to a different account identifier and a value and comprising historical transaction data of transactions performed through the account;
receive, via the network interface from each of a plurality of computing devices executing a first application, potential transaction data corresponding to a potential transaction associated with the computing device;
generate a potential transaction identifier for each of the potential transactions;
establish, via the network interface, a connection with a client device through a second application executing on the client device, the second application corresponding to a first account of the plurality of accounts and a first account identifier;
select a subset of the potential transactions based on first historical transaction data of the first account satisfying a selection policy with each of the subset of potential transactions;
present, via the connection through the second application on the client device, the selected subset of the potential transactions on a user interface at the client device;
receive, from the client device through the connection, a selection of a first potential transaction from the subset of the potential transactions;
in response to the selection, generate an account potential transaction code based on the first account identifier of the first user account and a first potential transaction identifier of the first potential transaction;
transmit the account potential transaction code to a second computing device;
subsequent to transmitting the account potential transaction code to the second computing device, receive a transaction request for a transaction, the transaction request comprising the account potential transaction code; and responsive to receiving the transaction request and based on the transaction request comprising the account potential transaction code, update the first user account to indicate the transaction.

2. The system of claim 1, wherein the execution of the instructions causes the one or more processors to generate the account potential transaction code by concatenating at least a first portion of the first account identifier with at least a second portion of the first potential transaction identifier.

3. The system of claim 1, wherein the execution of the instructions further causes the one or more processors to:
identify a second account that transmitted the transaction request for the transaction; and
insert a flag indicating validation of the second account responsive to completing the transaction.

4. The system of claim 1, wherein the execution of the instructions further causes the one or more processors to:
assign an account potential transaction value to the account potential transaction code;
store a counter corresponding to the account potential transaction code;
receive a second transaction request for a second transaction, the transaction request comprising the account potential transaction code; and
responsive to determining the second transaction would cause the counter to exceed the account potential transaction value, insert a flag into the first account indicating the first potential transaction code is expired.

5. The system of claim 1, wherein the execution of the instructions further causes the one or more processors to:
generate a plurality of account potential transaction codes based on each of a plurality of account identifiers of a plurality of accounts and the first potential transaction identifier;
assign a potential transaction value to the first potential transaction identifier;
store a counter corresponding to the potential transaction value;
increment the counter by a transaction value of the transaction;
determine that incrementing the counter causes a count of the counter to exceed a threshold; and
insert a flag into memory indicating the potential transaction value is stale.

6. The system of claim 5, wherein the execution of the instructions further causes the one or more processors to:
receive a second transaction request for a second transaction, the transaction request comprising the account potential transaction code; and
responsive to identifying the flag in memory, generate an indication that the account potential transaction code could not be used to perform the second transaction.

7. The system of claim 5, wherein the flag restricts sharing of any account potential transaction codes generated based on the first potential transaction identifier.

8. The system of claim 1, wherein the execution of the instructions further causes the one or more processors to:
generate a uniform resource locator (URL) link for the account potential transaction code, the URL link comprising each of the account potential transaction code and the first account identifier;
transmit the URL link to the client device;
subsequent to transmitting the account potential transaction code to the client device, receive an indication of a selection of the URL link; and
responsive to receiving the indication of the selection of the URL link, update the first user account to indicate the selection of the URL link.

9. The system of claim 1, wherein the execution of the instructions further causes the one or more processors to:
responsive to receiving the transaction request, identify an identifier of a first computing device associated with the first potential transaction; and
transmit data of the transaction request to the first computing device to complete the transaction.

10. The system of claim 1, wherein the execution of the instructions further causes the one or more processors to select the subset of the potential transactions by:
determining a type of potential transaction for each of the potential transactions;
determining one or more account preferences for each of the plurality of accounts; and
selecting the subset of potential transactions based on each potential transaction of the subset having a type of potential transaction that matches first one or more account preferences of the first user account.

11. The system of claim 10, wherein the execution of the instructions further causes the one or more processors to determine the type of potential transaction for each of the potential transactions based on a stored transaction type that is assigned to the computing device that transmitted the potential transaction data for the potential transaction to the one or more processors.

12. The system of claim 10, wherein the execution of the instructions further causes the one or more processors to determine the one or more account preferences for each of the plurality of accounts based on historical transaction data of transactions performed through the account.

13. They system of claim 10, wherein the execution of the instructions further causes the one or more processors to determine the one or more account preferences for the first user account by:
maintaining a transaction type counter for each of a plurality of types of potential transactions for the first user account;
for each transaction type counter for the first user account, increment the transaction type counter for each transaction that the first user account performs that corresponds to the type of potential transaction of the transaction type counter; and
responsive to a transaction type counter having a count exceeding a threshold, determine a type of potential transaction that corresponds to the transaction type counter is an account preference for the first user account.

14. They system of claim 10, wherein the execution of the instructions further causes the one or more processors to determine the one or more account preferences for the first user account by:
maintaining a transaction type counter for each of a plurality of types of potential transactions for the first user account;
for each transaction type counter for the first user account, increment the transaction type counter for each transaction that the first user account performs that corresponds to the type of potential transaction of the transaction type counter; and
responsive to determining counts of a plurality of transaction type counters for the first user account satisfy a condition, determine types of potential transactions that correspond to the plurality of types of potential transaction are account preferences for the first user account.

15. They system of claim 10, wherein the execution of the instructions further causes the one or more processors to present the selected subset of potential transactions presenting the potential transaction data of each of the subset of potential transactions in separate widgets each corresponding with a different potential transaction of the subset of potential transactions.

16. The system of claim 1, wherein the execution of the instructions further causes the one or more processors to store, in a data structure for the first user account, a list of potential transactions for which an account potential transaction code has been generated for the first user account.

17. A method, comprising:
storing, by one or more processors in memory, a database comprising a plurality of accounts, each account corresponding to a different account identifier and a value and comprising historical transaction data of transactions performed through the account;
receiving, by the one or more processors and from each of a plurality of computing devices executing a first application, potential transaction data corresponding to a potential transaction associated with the computing device;
generating, by the one or more processors, a potential transaction identifier for each of the potential transactions;
establishing, by the one or more processors, a connection with a client device through a second application executing on the client device, the second application corresponding to a first account of the plurality of accounts and a first account identifier;
selecting, by the one or more processors, a subset of the potential transactions based on first historical transaction data of the first account satisfying a selection policy with each of the subset of potential transactions;
presenting, by the one or more processors via the connection through the second application on the client device, the selected subset of the potential transactions on a user interface at the client device;
receiving, by the one or more processors from the client device through the connection, a selection of a first potential transaction from the subset of the potential transactions;
in response to the selection, generating, by the one or more processors, an account potential transaction code based on the first account identifier of the first user account and a first potential transaction identifier of the first potential transaction;
transmitting, by the one or more processors, the account potential transaction code to a second computing device;
subsequent to transmitting the account potential transaction code to the second computing device, receiving, by the one or more processors, a transaction request for a transaction, the transaction request comprising the account potential transaction code; and
responsive to receiving the transaction request and based on the transaction request comprising the account potential transaction code, updating, by the one or more processors, the first user account to indicate the transaction.

18. The method of claim 17, wherein generating the account potential transaction code comprises concatenating, by the one or more processors, at least a first portion of the first account identifier with at least a second portion of the first potential transaction identifier.

19. A non-transitory computer-readable media comprising computer-executable instructions embodied thereon that, when executed by a processor, cause the processor to perform a process comprising:
storing, in memory, a database comprising a plurality of accounts, each account corresponding to a different account identifier and a value and comprising historical transaction data of transactions performed through the account;
receiving, from each of a plurality of computing devices executing a first application, potential transaction data corresponding to a potential transaction associated with the computing device;
generating a potential transaction identifier for each of the potential transactions;
establishing a connection with a client device through a second application executing on the client device, the second application corresponding to a first account of the plurality of accounts and a first account identifier;
selecting a subset of the potential transactions based on first historical transaction data of the first account satisfying a selection policy with each of the subset of potential transactions;
presenting, via the connection through the second application on the client device, the selected subset of the potential transactions on a user interface at the client device;
receiving, from the client device through the connection, a selection of a first potential transaction from the subset of the potential transactions;
in response to the selection, generating an account potential transaction code based on the first account identifier of the first user account and a first potential transaction identifier of the first potential transaction;
transmitting the account potential transaction code to a second computing device;
subsequent to transmitting the account potential transaction code to the second computing device, receiving a transaction request for a transaction, the transaction request comprising the account potential transaction code; and
responsive to receiving the transaction request and based on the transaction request comprising the account potential transaction code, updating the first user account to indicate the transaction.

20. The non-transitory computer-readable medium of claim 19, wherein generating the account potential transaction code comprises concatenating at least a first portion of the first account identifier with at least a second portion of the first potential transaction identifier.

* * * * *